US011291334B2

(12) United States Patent
Bahreinian et al.

(10) Patent No.: US 11,291,334 B2
(45) Date of Patent: Apr. 5, 2022

(54) GRILL APPARATUS AND FIREBOX ASSEMBLY FOR USE IN A GRILL

(71) Applicant: NewAge Products, Inc., Vaughan (CA)

(72) Inventors: Hessam Bahreinian, Toronto (CA); Robert Vandenham, Woodbridge (CA)

(73) Assignee: NewAge Products, Inc., Vaughan (CA)

( * ) Notice: Subject to any disclaimer, the term of this patent is extended or adjusted under 35 U.S.C. 154(b) by 253 days.

(21) Appl. No.: 16/775,919

(22) Filed: Jan. 29, 2020

(65) Prior Publication Data

US 2021/0228026 A1    Jul. 29, 2021

(51) Int. Cl.
| | |
|---|---|
| *A47J 37/07* | (2006.01) |
| *F24B 13/00* | (2006.01) |
| *F24B 13/02* | (2006.01) |
| *F24B 5/02* | (2006.01) |
| *F24B 1/02* | (2006.01) |
| *F24B 1/00* | (2006.01) |

(Continued)

(52) U.S. Cl.
CPC ....... *A47J 37/0786* (2013.01); *A47J 37/0704* (2013.01); *F23B 60/02* (2013.01); *F23L 1/02* (2013.01); *F23L 3/00* (2013.01); *F23L 9/00* (2013.01); *F23L 11/02* (2013.01); *F24B 1/003* (2013.01); *F24B 1/028* (2013.01); *F24B 5/026* (2013.01); *F24B 13/008* (2013.01); *F24B 13/02* (2013.01); *F23B 2700/013* (2013.01)

(58) Field of Classification Search
None
See application file for complete search history.

(56) References Cited

U.S. PATENT DOCUMENTS

| 76,455 A | * | 4/1868 | Hosford | F24B 5/04 |
| | | | | 126/74 |
| 816,412 A | * | 3/1906 | Wilt | F24B 7/04 |
| | | | | 126/71 |

(Continued)

FOREIGN PATENT DOCUMENTS

| WO | 2009012793 A1 | 1/2009 |
| WO | 2013116946 A1 | 8/2013 |

(Continued)

OTHER PUBLICATIONS

Big Green Egg, Egghead Forum, "I'm Hanging a Chicken Too Blog", Oct. 2014, 9 pages.

(Continued)

*Primary Examiner* — David J Laux
(74) *Attorney, Agent, or Firm* — Howard & Howard Attorneys, PLLC

(57) ABSTRACT

A grill apparatus includes a bottom portion, a lid portion, a firebox and an ash bucket. The lid portion is coupled to the bottom portion forming a cooking chamber. The bottom portion receives the firebox. A support structure of the firebox rests on an inner surface of the bottom portion. An inner surface of the bottom port, the support structure of the firebox and a firebox lower opening define a first air path from a lower portion of the cooking chamber to a heat chamber. The ash bucket includes an air vent extending from a base of the ash bucket base into an internal ash receptacle and has an upper vent aperture with a vent cover connected to the air vent. The cover is disposed over an upper vent aperture to further define the first air path.

32 Claims, 28 Drawing Sheets

(51) Int. Cl.
*F23L 1/02* (2006.01)
*F23L 3/00* (2006.01)
*F23L 9/00* (2006.01)
*F23L 11/02* (2006.01)
*F23B 60/02* (2006.01)

(56) References Cited

U.S. PATENT DOCUMENTS

| | | | |
|---|---|---|---|
| 1,587,328 A * | 6/1926 | Jones | F24B 7/04 |
| | | | 126/71 |
| 3,289,667 A * | 12/1966 | Nelson | F24B 1/195 |
| | | | 126/541 |
| 4,603,679 A * | 8/1986 | Ogden | A47J 37/07 |
| | | | 126/25 B |
| 6,616,058 B1 | 9/2003 | Pirkle | |
| 6,742,446 B2 | 6/2004 | McLemore et al. | |
| 6,827,076 B2 | 12/2004 | Crawford et al. | |
| 6,945,161 B1 | 9/2005 | Battaglia et al. | |
| 6,966,253 B2 | 11/2005 | Witzel | |
| 7,040,219 B1 | 5/2006 | D'Amato et al. | |
| 7,237,476 B1 | 7/2007 | Bourgeois et al. | |
| 7,281,469 B1 | 10/2007 | Barbour et al. | |
| 7,516,692 B2 | 4/2009 | Pirkle et al. | |
| 7,644,711 B2 | 1/2010 | Creel | |
| D615,807 S | 5/2010 | Creel | |
| D615,814 S | 5/2010 | Creel | |
| D642,416 S | 8/2011 | Scott et al. | |
| D671,361 S | 11/2012 | Witzel et al. | |
| D680,372 S | 4/2013 | Brennan | |
| D683,177 S | 5/2013 | Brennan | |
| 8,464,702 B2 | 6/2013 | Foster | |
| 8,516,644 B2 | 8/2013 | Witzel et al. | |
| D709,315 S | 7/2014 | Witzel et al. | |
| D726,491 S | 4/2015 | Witzel et al. | |
| 9,016,190 B2 | 4/2015 | Webb | |
| 9,096,247 B2 | 8/2015 | Witzel et al. | |
| 9,101,244 B2 | 8/2015 | Samaras | |
| D741,605 S | 10/2015 | Witzel et al. | |
| 9,204,754 B1 | 12/2015 | Bourgeois | |
| 9,237,828 B2 | 1/2016 | Walters et al. | |
| 9,244,467 B2 | 1/2016 | Quinty | |
| 9,339,145 B1 | 5/2016 | Owczarzak | |
| 9,370,276 B2 | 6/2016 | Witzel et al. | |
| 9,554,671 B2 | 1/2017 | Poon | |
| D781,647 S | 3/2017 | Bogazzi | |
| 9,603,484 B2 | 3/2017 | Cleveland et al. | |
| 9,655,472 B1 | 5/2017 | Alvarenga | |
| 9,668,615 B2 | 6/2017 | Contarino, Jr. | |
| 9,681,775 B2 | 6/2017 | Contarino, Jr. | |
| 9,707,679 B1 | 7/2017 | Bogazz | |
| D802,997 S | 11/2017 | Bogazzi | |
| 9,814,352 B2 | 11/2017 | Ahmed | |
| 9,879,796 B2 | 1/2018 | Tallos et al. | |
| D809,340 S | 2/2018 | Poon | |
| D810,509 S | 2/2018 | Bogazzi | |
| 9,883,771 B2 | 2/2018 | Minnich | |
| D815,878 S | 4/2018 | Wong et al. | |
| D817,090 S | 5/2018 | Bogazzi | |
| 10,010,219 B1 | 7/2018 | Brewer | |
| 10,051,997 B2 | 8/2018 | Contarino, Jr. | |
| 10,070,754 B2 | 9/2018 | Schlosser et al. | |
| 10,070,755 B2 | 9/2018 | Schlosser et al. | |
| 10,085,595 B2 | 10/2018 | Minnich | |
| 10,092,135 B2 | 10/2018 | DeBruler | |
| 10,098,502 B2 | 10/2018 | Ohler et al. | |
| 10,125,995 B2 | 11/2018 | Kohli | |
| 10,132,502 B2 | 11/2018 | Contarino, Jr. | |
| 10,159,381 B2 | 12/2018 | Walters et al. | |
| D837,593 S | 1/2019 | Trudnak et al. | |
| 10,231,575 B1 | 3/2019 | Nicoll et al. | |
| D844,362 S | 4/2019 | Davis et al. | |
| 10,258,145 B2 | 4/2019 | Witzel et al. | |
| 10,299,626 B2 | 5/2019 | Walters et al. | |
| D850,853 S | 6/2019 | Brennan | |
| D851,450 S | 6/2019 | Brennan | |
| D851,451 S | 6/2019 | Brennan | |
| 10,405,699 B2 | 9/2019 | Contarino, Jr. | |
| 2005/0279223 A1 | 12/2005 | McPeak | |
| 2008/0268121 A1 * | 10/2008 | Karau | A47J 37/0786 |
| | | | 426/523 |
| 2012/0060823 A1 * | 3/2012 | Armangue Casademont | |
| | | | A47J 37/079 |
| | | | 126/25 B |
| 2012/0107476 A1 | 5/2012 | McLemore et al. | |
| 2016/0255998 A1 | 9/2016 | Feng et al. | |
| 2017/0224157 A1 | 8/2017 | Rummel et al. | |
| 2017/0261385 A1 | 9/2017 | Kohli | |
| 2017/0336076 A1 | 11/2017 | Walters et al. | |
| 2017/0360238 A1 | 12/2017 | Bogazzi | |
| 2017/0367534 A1 | 12/2017 | Bogazzi | |
| 2017/0370592 A1 | 12/2017 | Bogazzi | |
| 2018/0008093 A1 | 1/2018 | Parker et al. | |
| 2018/0038502 A1 | 2/2018 | Tallos et al. | |
| 2018/0078090 A1 | 3/2018 | Boyd, Sr. et al. | |
| 2018/0098662 A1 | 4/2018 | Klassen | |
| 2018/0116453 A1 | 5/2018 | Boyd, Sr. et al. | |
| 2018/0132659 A1 | 5/2018 | Morgan | |
| 2018/0153344 A1 | 6/2018 | Scott et al. | |
| 2018/0177336 A1 | 6/2018 | Brennan | |
| 2018/0180286 A1 | 6/2018 | Brennan | |
| 2018/0220844 A1 * | 8/2018 | Walters | A47J 37/0759 |
| 2018/0263415 A1 | 9/2018 | Hackley | |
| 2018/0317706 A1 | 11/2018 | Graves et al. | |
| 2018/0368619 A1 | 12/2018 | Boyd, Sr. | |
| 2019/0029466 A1 | 1/2019 | Zhao | |
| 2019/0059652 A1 | 2/2019 | Kohli | |
| 2019/0099040 A1 | 4/2019 | Hopper | |
| 2019/0246839 A1 | 8/2019 | Trudnak et al. | |
| 2019/0282031 A1 | 9/2019 | Feng | |
| 2020/0046163 A1 * | 2/2020 | Yang | A47J 36/04 |

FOREIGN PATENT DOCUMENTS

| | | |
|---|---|---|
| WO | 2016171775 A1 | 10/2016 |
| WO | 2017220088 A1 | 12/2017 |
| WO | 2018204265 A1 | 11/2018 |
| WO | 2018208919 A1 | 11/2018 |
| WO | 2019079371 A1 | 4/2019 |
| WO | 2019104274 A1 | 5/2019 |
| WO | 2019104372 A1 | 6/2019 |
| WO | 2019140002 A1 | 7/2019 |
| WO | 2019104274 A9 | 9/2019 |
| WO | 2019210387 A1 | 11/2019 |

OTHER PUBLICATIONS

Design U.S. Appl. No. 29/722,399, filed Jan. 29, 2020.
English language abstract for WO 2009/012793 A1 extracted from espacenet.com database on Apr. 13, 2020, 1 page.
English language abstract for WO 2017/220088 A1 extracted from espacenet.com database on Apr. 13, 2020, 1 page.
English language abstract for WO 2019/210387 A1 extracted from espacenet.com database on Apr. 13, 2020, 1 page.

* cited by examiner

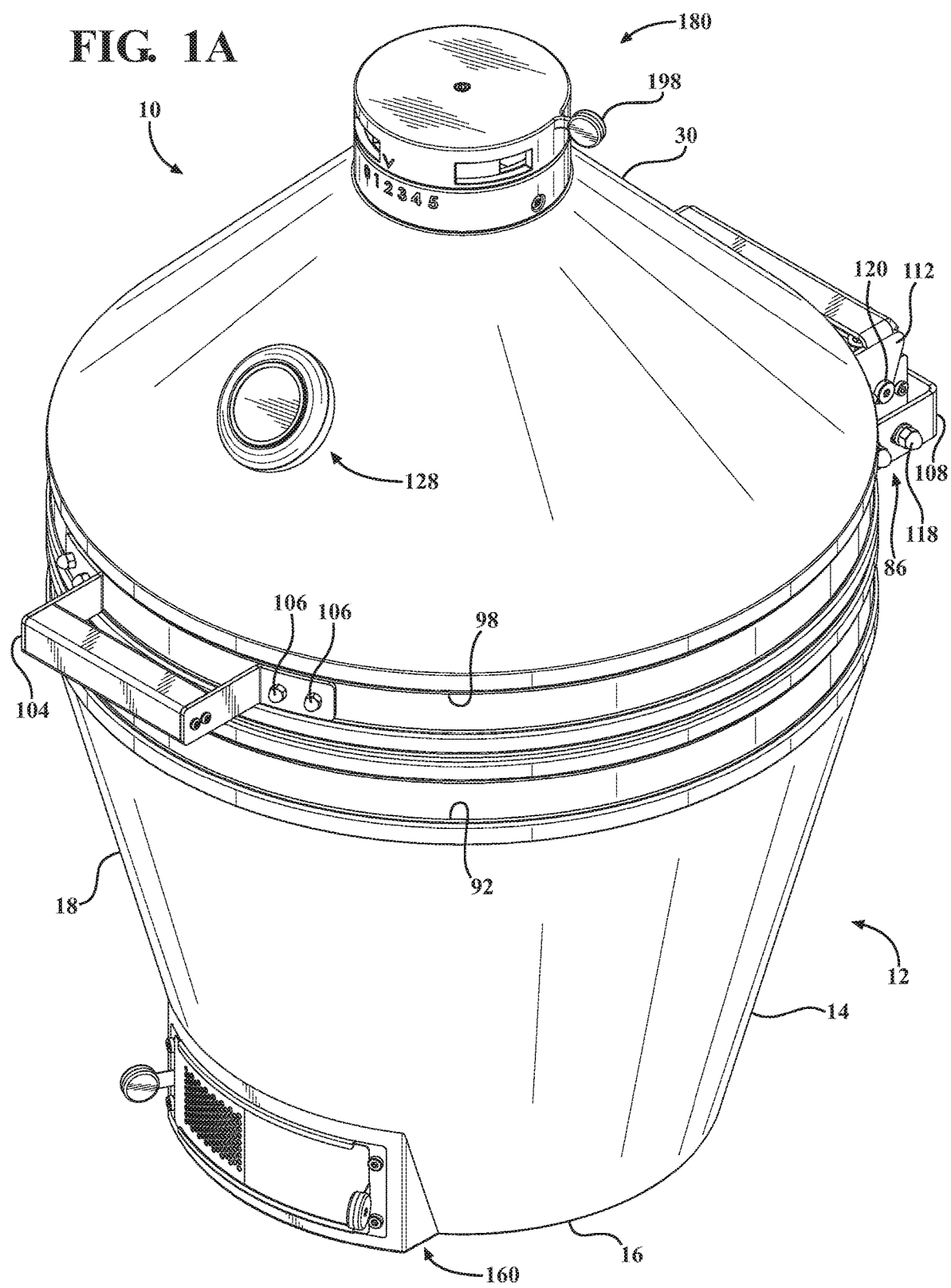

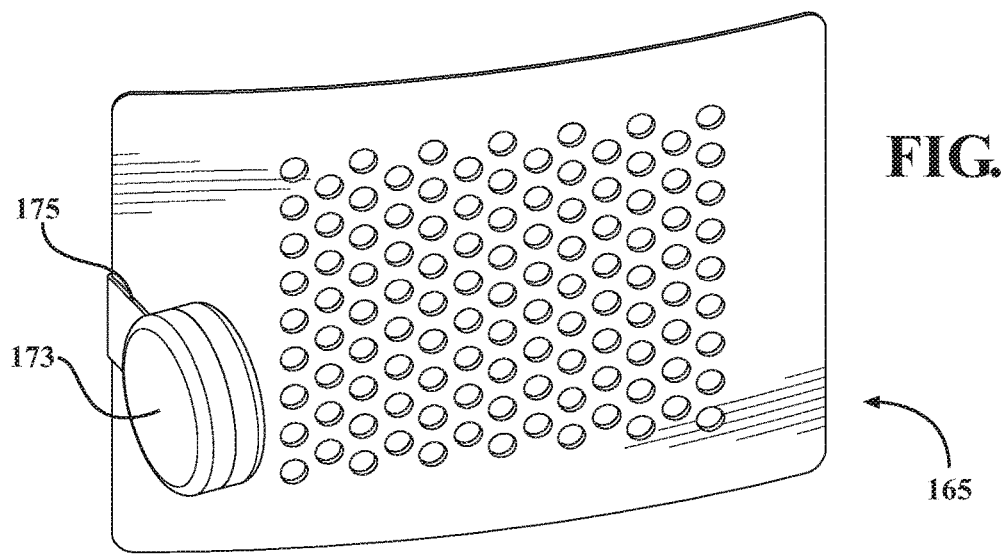
FIG. 11C
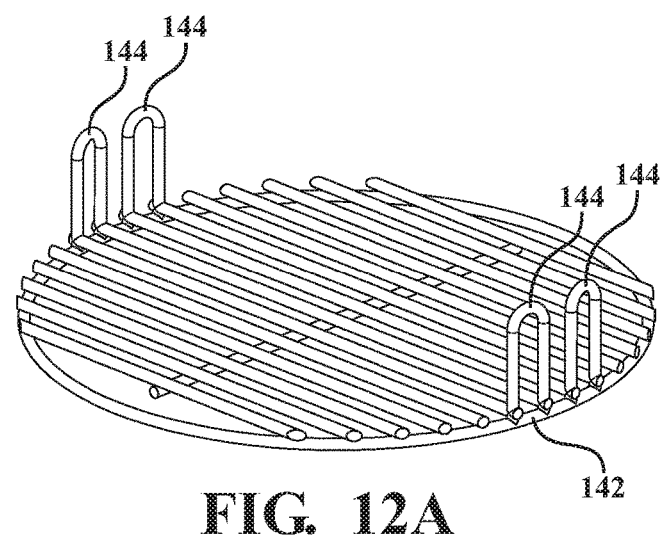
FIG. 12A
FIG. 12B
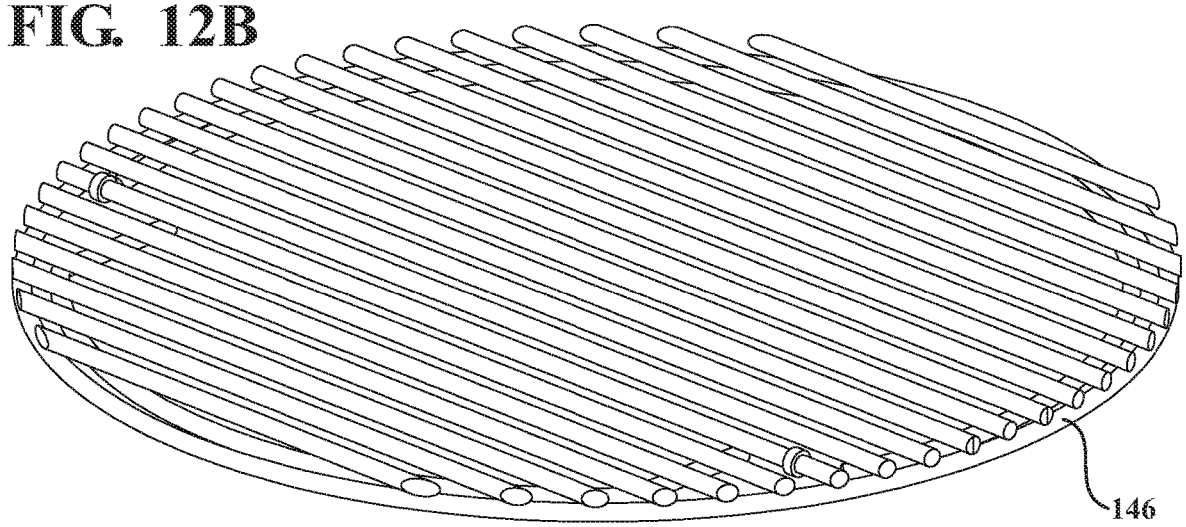

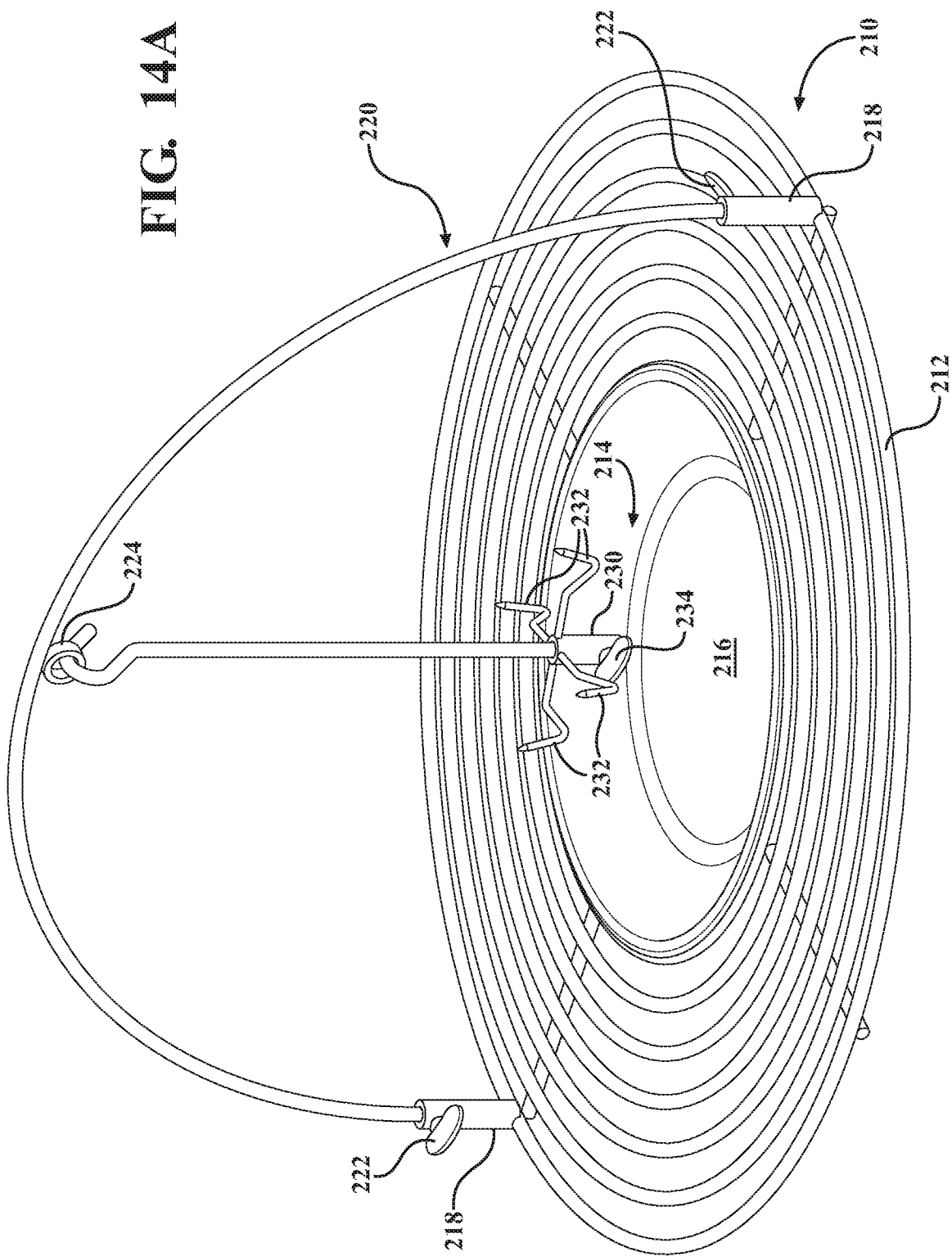

GRILL APPARATUS AND FIREBOX ASSEMBLY FOR USE IN A GRILL

FIELD OF THE INVENTION

The present invention relates to outdoor grills, and more specifically, to an outdoor grill having a firebox that forms an air path between a cooking chamber and a heat chamber and an ash bucket to retain ashes.

BACKGROUND OF THE INVENTION

Many people enjoy utilizing outdoor cooking or barbecue grills or smokers to prepare or cook a variety of foods. There are various types of outdoor cooking grills, including covered grills that may be in the shape of barrels or kettle-type grills.

Smokers and/or kettle-type grills typically includes a lower portion and a lid. The lower portion is closed at the bottom and open at the top and the lid is generally closed at the top and open at the bottom. The lid may be unconnected to the lower portion or may be hinged thereto. The lid is designed to fit on top and mate with the lower portion forming an interior space. The interior space may be designed to hold fuel, such as charcoal and/or wood to burn fuel, such as natural gas or propane, that may be piped in from an exterior source. The fuel is burned to heat the interior space. The interior space generally includes a cooking surface, such as a cooking grill or grate that is spaced above the burning fuel.

One product of the cooking process may be ashes created by the burning of the fuel and/or cooking of the food. Generally, the ashes will fall to the bottom of the lower portion and must be removed from the lower portion which may require removal of all the interior components of the grill and either emptying of the ashes using a utensil, e.g., a scoop or small shovel, or lifting of the lower portion to assist in removing the ashes. This is a time consuming and messy operation.

One or more adjustable air vents may be provided within the lower portion and the lid to provide the user control of the temperature within the interior space. Generally, an adjustable air vent may be provided in one or more sides of the lower portion and an air vent may be provided near the top of the lid. Air will generally enter the air vent(s) in the lower portion and rise and exit the air vent in the lid. However, due to the shape of the grill and/or the location of the air vents, air flow within the interior of the grill is not uniform. Thus, heat distribution within the grill will not be uniform throughout the interior of the grill, thereby causing, inconsistent cooking of the food within the grill.

The present invention is aimed at one or more of the problems identified above.

SUMMARY OF THE INVENTION

In one aspect of the present invention, a grill apparatus is provided. The grill apparatus includes a bottom portion, a lid portion, a firebox and an ash bucket. The bottom portion has a bottom base, a bottom side wall and a bottom upper opening. The bottom side wall extends between the bottom base and the bottom upper opening forming an internal bottom cavity. The lid portion has a lid upper end, a lid side wall, and a lid lower opening. The lid side wall extends between the lid upper end and the lid lower opening forming an internal lid cavity. The lid portion is coupled to the bottom portion with the internal bottom cavity and the internal lid cavity forming a cooking chamber. The firebox has a firebox lower opening, a firebox upper opening, and a firebox side wall that extends between the firebox lower and upper openings forming a heat chamber. The firebox has a support structure that extends from the firebox lower opening in a direction opposite the firebox upper opening. The bottom portion receives the firebox with the support structure resting on an inner surface of the bottom base. The inner surface of the bottom base, the support structure of the firebox and the firebox lower opening define a first air path from a lower portion of the cooking chamber to the heat chamber. The ash bucket has an ash bucket base, an ash bucket upper opening and an ash bucket side wall. The ash bucket side wall extends between the ash bucket base and the ash bucket upper opening defining an ash receptacle. The ash bucket further includes an air vent extending from the ash bucket base into the ash receptacle and has an upper vent aperture with a vent cover connected to the air vent and disposed over the upper vent aperture to further define the first air path.

In another aspect of the present invention, a firebox assembly for use in a grill is provided. The firebox assembly include a firebox and an ash bucket. The firebox has a firebox lower opening, a firebox upper opening, and a firebox side wall that extends between the firebox lower and upper openings and forms a heat chamber. The firebox includes a support structure that extends from the firebox lower opening in a direction opposite the firebox upper opening. The support structure is configured to rest on an inner surface of the grill with the support structure and the firebox lower opening defines an air path to the heat chamber. The ash bucket includes an ash bucket base, an ash bucket upper opening and an ash bucket side wall with the ash bucket side wall extending between the ash bucket base and the ash bucket upper opening defining an ash receptacle. The ash bucket further includes an air vent extending from the ash bucket base into the ash receptacle and having an upper vent aperture and a cover connected to the air vent and disposed over the upper vent aperture to define an air gap.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1A is a perspective view of the grill having a bottom portion and a lid portion, according to a first embodiment of the present invention;

FIG. 11C is a perspective view of a mesh vent slide of the lower vent assembly of FIG. 11A;

FIG. 12A is a perspective view of a charcoal grate of the grill of FIG. 1A;

FIG. 12B is a perspective view of a cooking grate of the grill of FIG. 1A;

DETAILED DESCRIPTION OF INVENTION

Figure 1B:
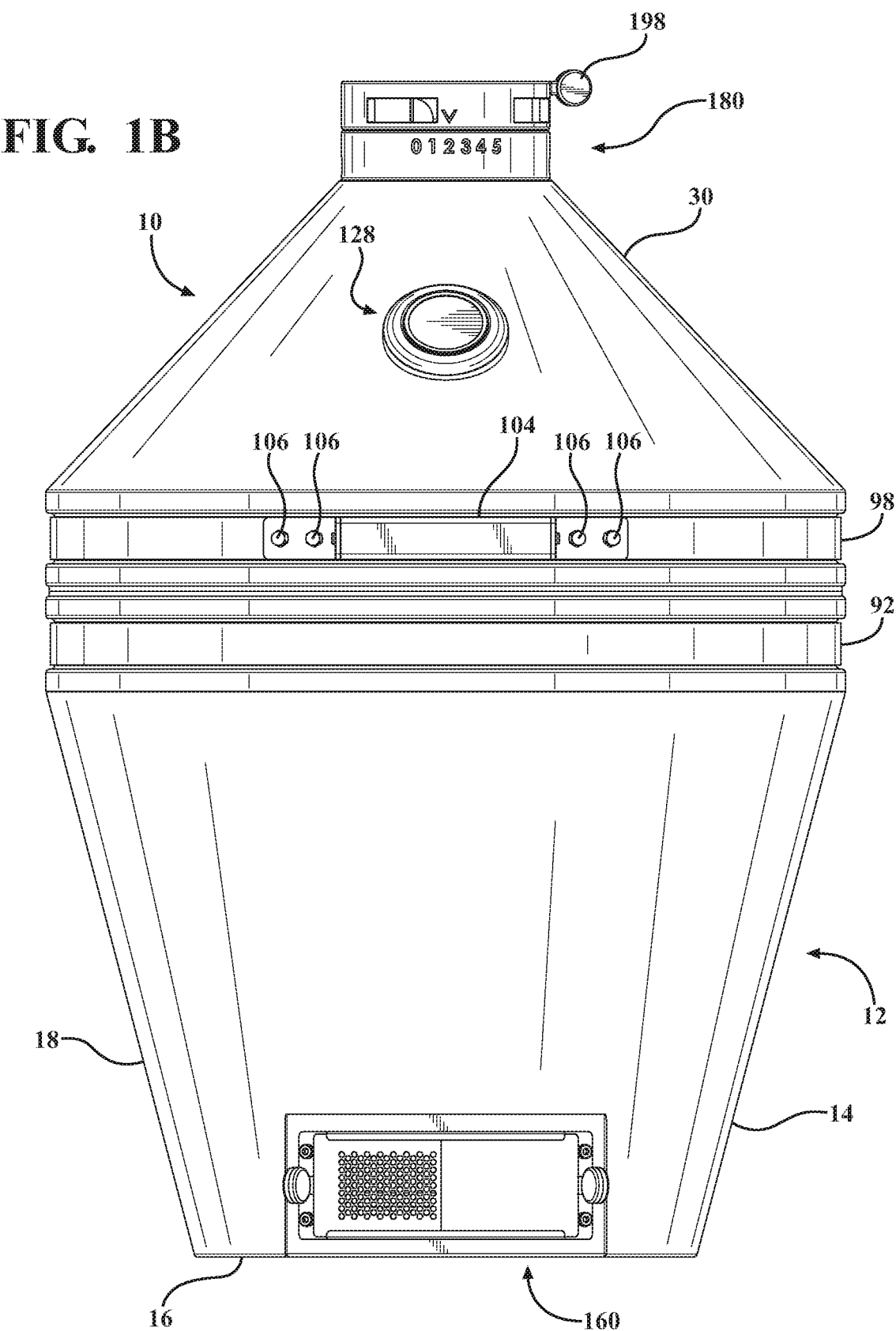
FIG. 1B is a front elevational view of the grill shown in FIG. 1A.
Figure 1C:
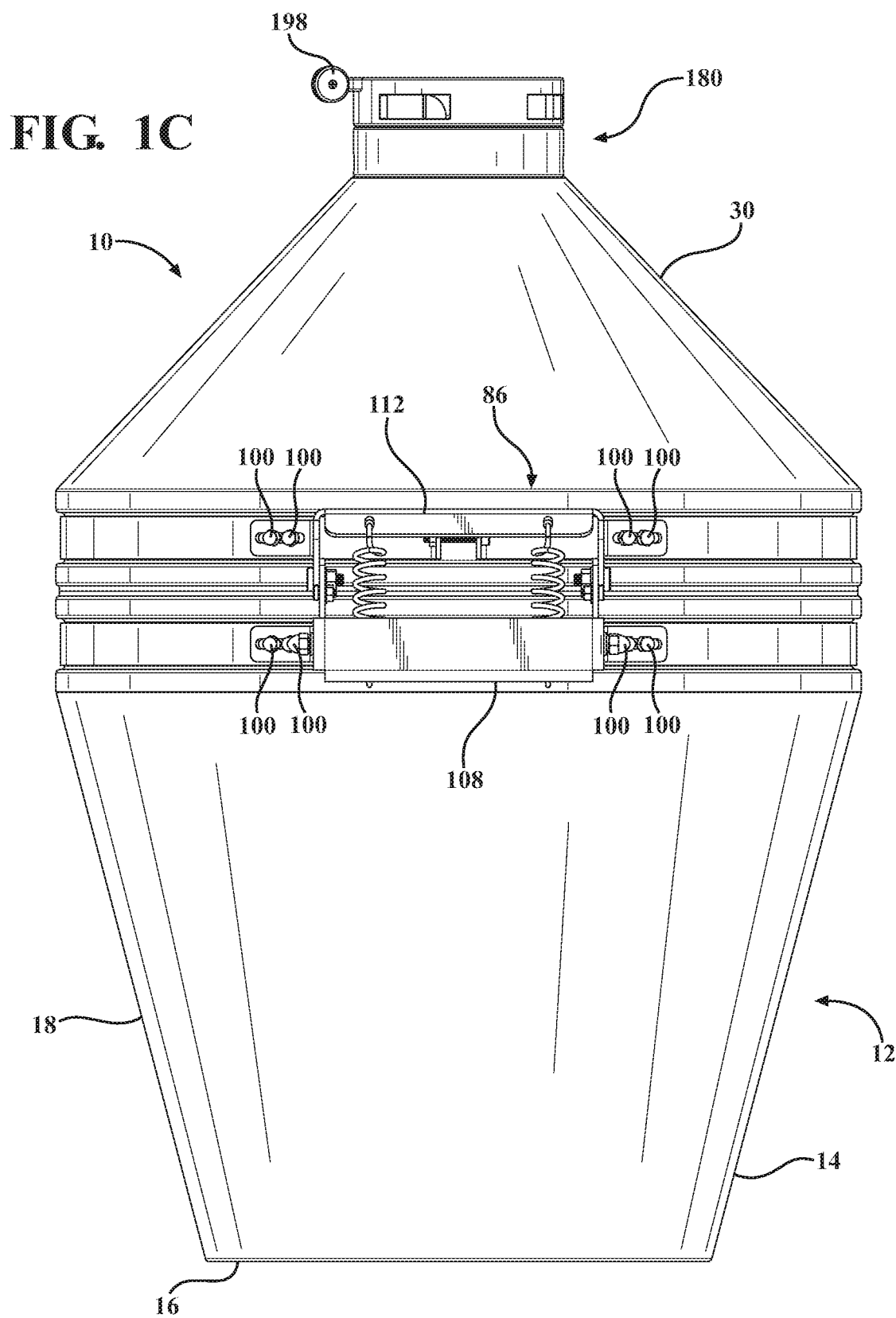
FIG. 1C is a rear elevational view of the grill shown in FIG. 1A.
Figure 1D:
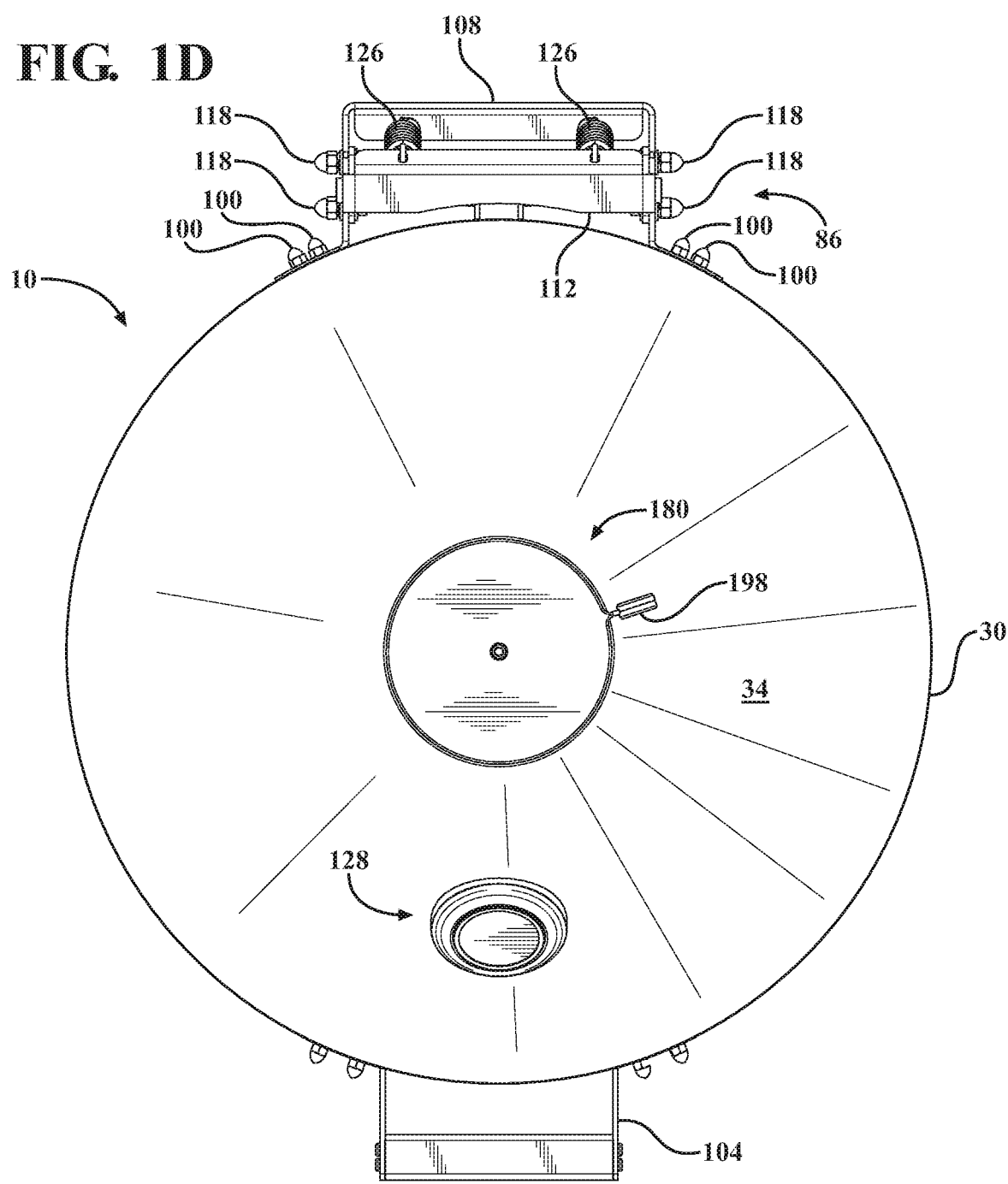
FIG. 1D is a top plan view of the grill shown in FIG. 1A.
Figure 1E:
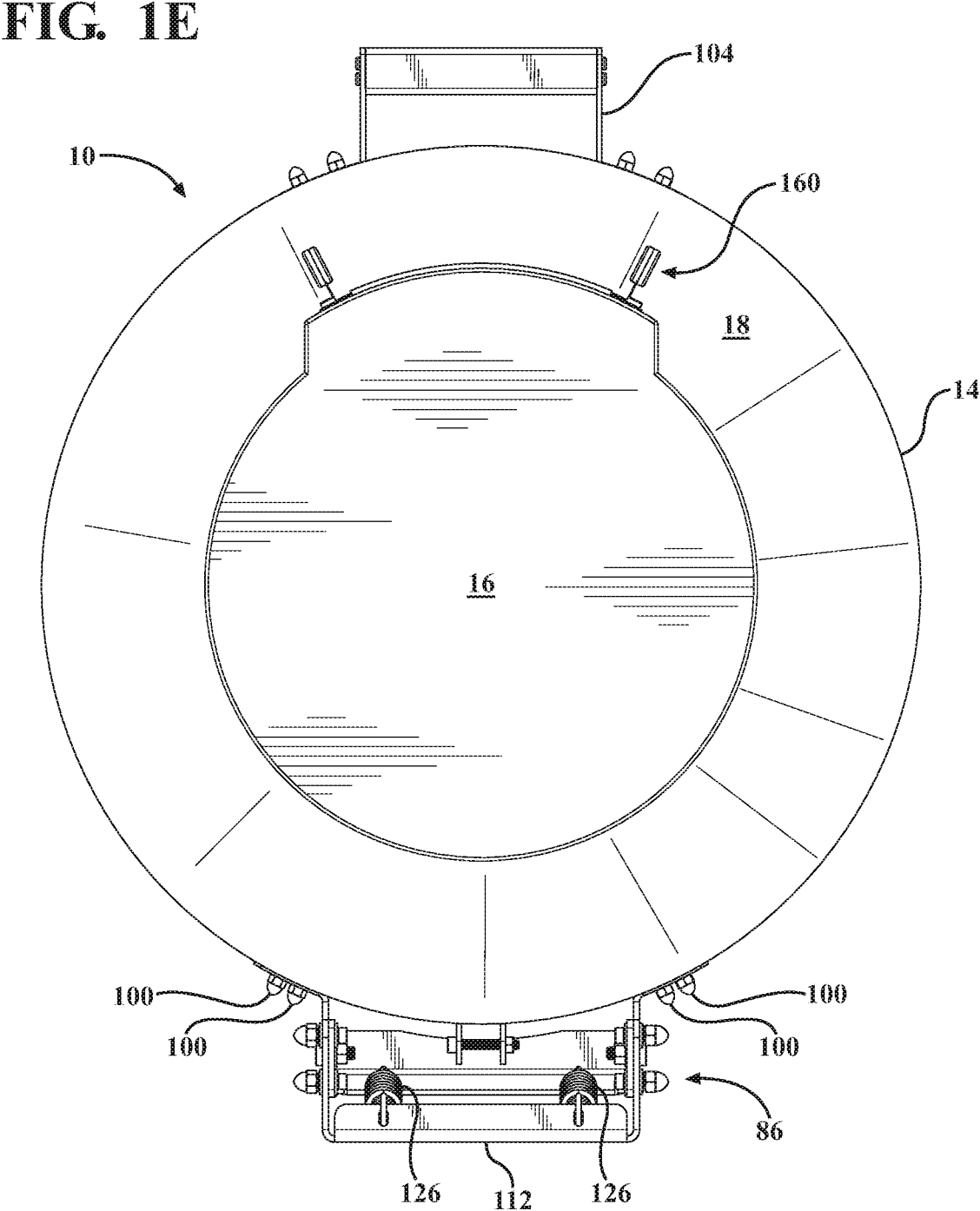
FIG. 1E is a bottom plan view of the grill shown in FIG. 1A.
Figure 1F:
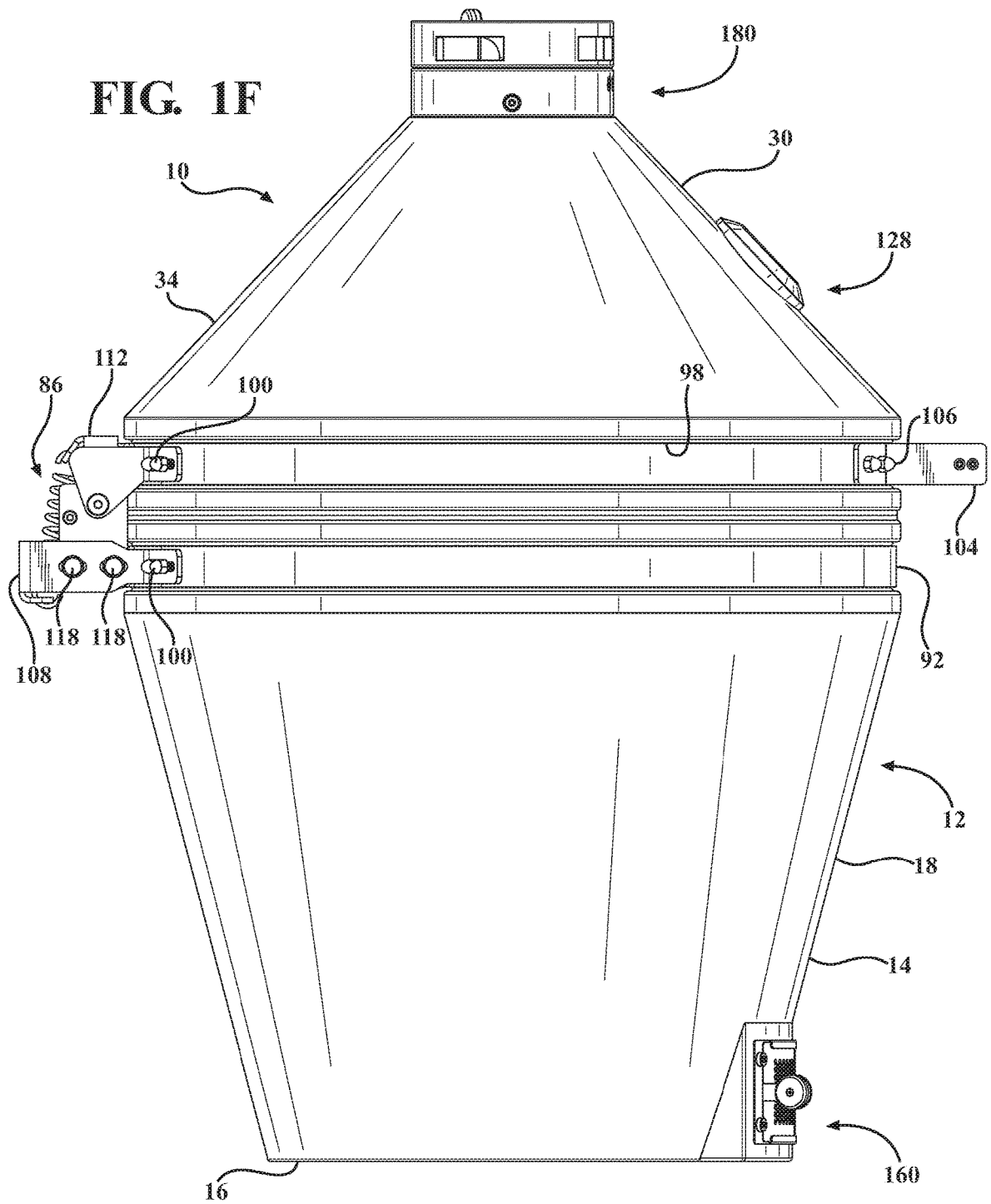
FIG. 1F is a first side elevational view of the grill shown in FIG. 1A.

Referring to the Figures, wherein like numerals indicate like or corresponding parts throughout the several views, am embodiment of a grill 10 having a grill apparatus 12 for cooking for items of food. In one embodiment, the grill apparatus 12 includes a bottom portion 14, a lid portion 30, a firebox 50 and an ash bucket 70. In one aspect of the present invention, the firebox 50 and the ash bucket 70 form a firebox assembly 52. As described in further detail below, the firebox 50 and ash bucket 70 define a first air path 62 that provides improved air flow through the grill 10 to improve cooking of the food items (not shown), e.g., to provide more uniform heat to the food items and/or reduced cooking time. In addition, the firebox 50 and the ash bucket 70 may provide an improved structure to retain and improve the retention and removal of ashes (created by the spent cooking fuel, e.g., charcoal) from the bottom portion 14 of the grill 10.

As shown in FIGS. 3A-3E, the bottom portion 14 has a bottom base 16, a bottom side wall 18 and a bottom upper opening 20. The bottom base 16 has a flat or relatively flat outer surface. The bottom side wall 18 extends between the bottom base 16 and the bottom upper opening 20 to form an internal bottom cavity 22. In the illustrated embodiment the bottom side wall 18 is flat or linear as it extends from the bottom base 16 towards the bottom upper opening 20. However, it should be noted that the outer shape or surface of the bottom side wall 18 could have any shape or form without departing from the spirit of the invention. For example, the bottom portion 14 may alternatively have a domical or paraboloidal shape.

In one embodiment of the present invention, the bottom portion 14, the lid portion 30 and the firebox 50 are composed of a thermal insulating material capable of handling high temperatures, such as a ceramic material. However, it should be noted that the bottom portion 14 and the lid portion 30 may be composed of other suitable materials such as a refractory cement material or a metallic material, for example, cast iron, stainless steel or aluminum. In the illustrated embodiment, all or some of the outer surfaces of the bottom portion 14 and the lid portion 30 may have a glazed finish. Generally, the inner surfaces of the bottom portion 15 and the lid portion 30 are not glazed.

With reference to FIGS. 4A-4D, the lid portion 30 has a lid upper end 32, a lid side wall 34, and a lid lower opening 36. The lid side wall 34 extends between the lid upper end 32 and the lid lower opening 36 to form an internal lid cavity 38. The lid portion 30 is coupled to the bottom portion 14 with the internal bottom cavity 22 and the internal lid cavity 38 forming a cooking chamber 40. In the illustrated embodiment the lid side wall 34 is flat or linear as it extends from the lid upper end 32 towards the lid lower opening 36. However, it should be noted that the outer shape or surface of the lid side wall 34 could have any shape or form without departing from the spirit of the invention. For example, the lid portion 30 may alternatively have a domical or paraboloidal shape.

With reference to FIGS. 5A-5D, in one aspect of the present invention, the firebox 50 has a firebox lower opening 54, a firebox upper opening 56, and a firebox side wall 58 that extends between the firebox lower and upper openings 54, 56 forming a heat chamber 64.

The firebox 50 has a support structure 60 that extends from the firebox lower opening 54 in a direction opposite the firebox upper opening 56. The bottom portion 14 receives the firebox 50 with the support structure 60 resting on an inner surface 24 of the bottom base 16. The inner surface 24 of the bottom base 16, the support structure 60 of the firebox 50 and the firebox lower opening 54 define a first air path 62 from a lower portion of the cooking chamber 40 to the heat chamber 64. In the illustrated embodiment, the support structure 60 includes a plurality of legs 57 that extend from the firebox side wall 58

With reference to FIGS. 6A-6G, the ash bucket 70 has an ash bucket base 72, an ash bucket upper opening 74 and an ash bucket side wall 76. As shown, the ash bucket side wall 76 extends between the ash bucket base 72 and the ash bucket upper opening 74 to define an ash receptacle 78. The ash bucket 70 further includes an air vent 80 that extends from the ash bucket base 72 into the ash receptacle 78.

Figure 2A:
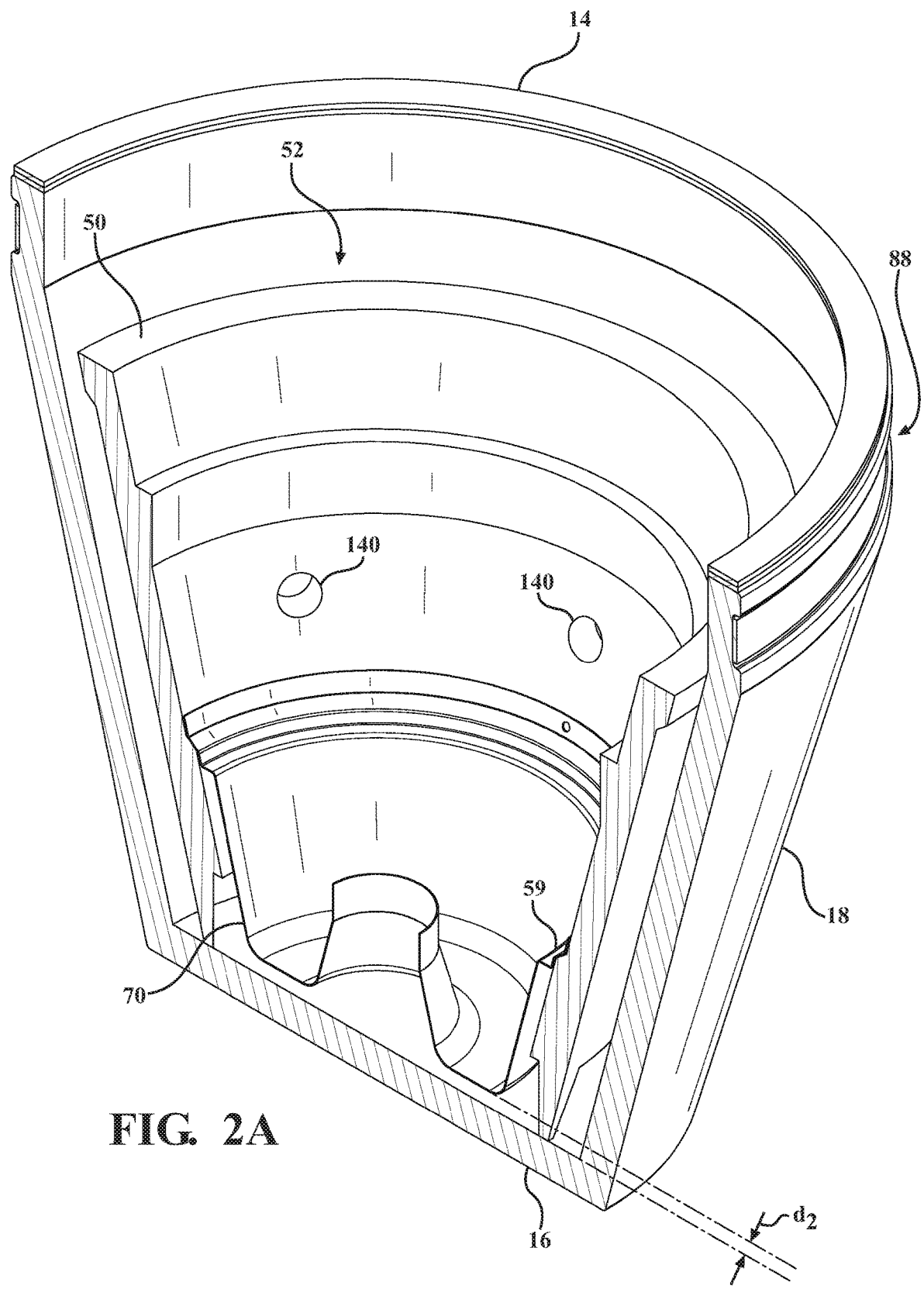
FIG. 2A is a cross-sectional view of the grill shown in FIG. 1A.

The ash bucket 70 includes an upper vent aperture 82 and a vent cover 84. The vent cover 84 is connected to the air vent 80 and is disposed over the upper vent aperture 82 to further define the first air path. In the illustrated embodiment, the air vent side wall 76 extends from a lower vent aperture 83 (upward in FIG. 6C) towards the upper vent aperture 82 and forms an air vent column 85. In the illustrated embodiment, the air vent column 85 has a generally circular cross-section and is centered on an axis of the ash bucket 70. The air vent column 85 may have a larger diameter adjacent the lower vent aperture 83 than adjacent the upper vent aperture 82 as shown. Further, in the illustrated embodiment, the upper vent aperture 82 is located opposite the lower vent aperture 83 with an air gap 89 being defined by the upper vent aperture 82 and a lower surface of the vent cover 84. As shown, the air gap 89 is located around the outer periphery of the upper vent aperture 82 and the distance between the upper vent aperture 82 and the lower surface of the vent cover 84 ($d_1$ in FIG. 6C) is relatively constant about the outer periphery of the upper vent aperture 82. The diameter of the vent cover 84 is greater than the diameter of the upper vent aperture 82 (see FIG. 6D) to assist in preventing ashes to fall through the air vent column 85. In the illustrated embodiment, the ash bucket 70 is contained within the firebox 50 (see FIGS. 2A and 2B). As shown, the ash bucket 70 includes an ash bucket lip 71 that rests on, and is supported by, a ledge 73 formed on the inner surface of the firebox side wall 58. Further, the ash bucket base 72 is spaced a distance, $d_2$, from the inner surface of the bottom base 16 of the bottom portion 14 (see FIG. 2A).

In the illustrated embodiment, the ash bucket 70 includes a pair of apertures 77 near the upper opening 74. The apertures 77 are located opposite one another. As shown in FIG. 6D, a removable handle 79 having a generally semicircular shape may include first and second ends inserted into respective apertures 77. The removable handle 79 rotates about the apertures 77 and when not in use may be rotated downward and rest within a well or channel near the upper opening. As discussed in more detail below, ashes resulting from the burning of fuel or the cooking of food products within the grill 10 may fall into the ash receptacle 78 of the ash bucket 70. Later, the ash bucket 70 may be removed from the grill 10 using the removable handle 79 and the ashes within the ash receptacle 78 disposed of before the empty ash bucket 70 is returned to the grill 10.

Figure 6A:
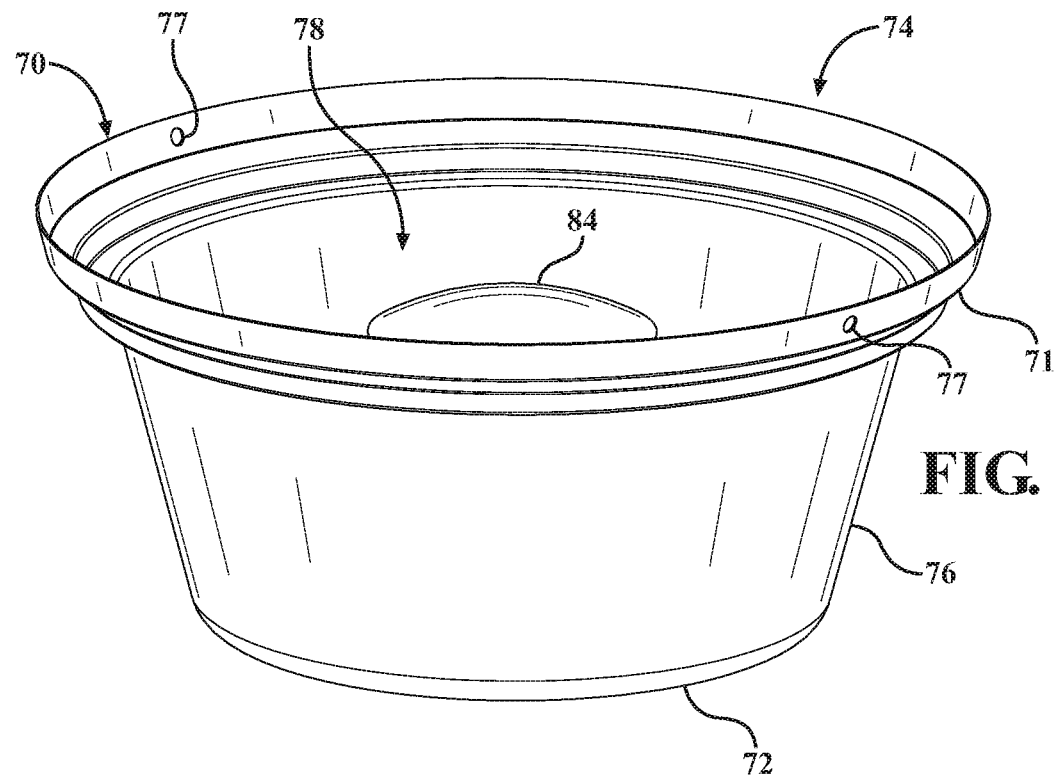
FIG. 6A is a perspective view of an ash bucket of the grill of FIG. 1A, according to an embodiment of the present invention.
Figure 6B:
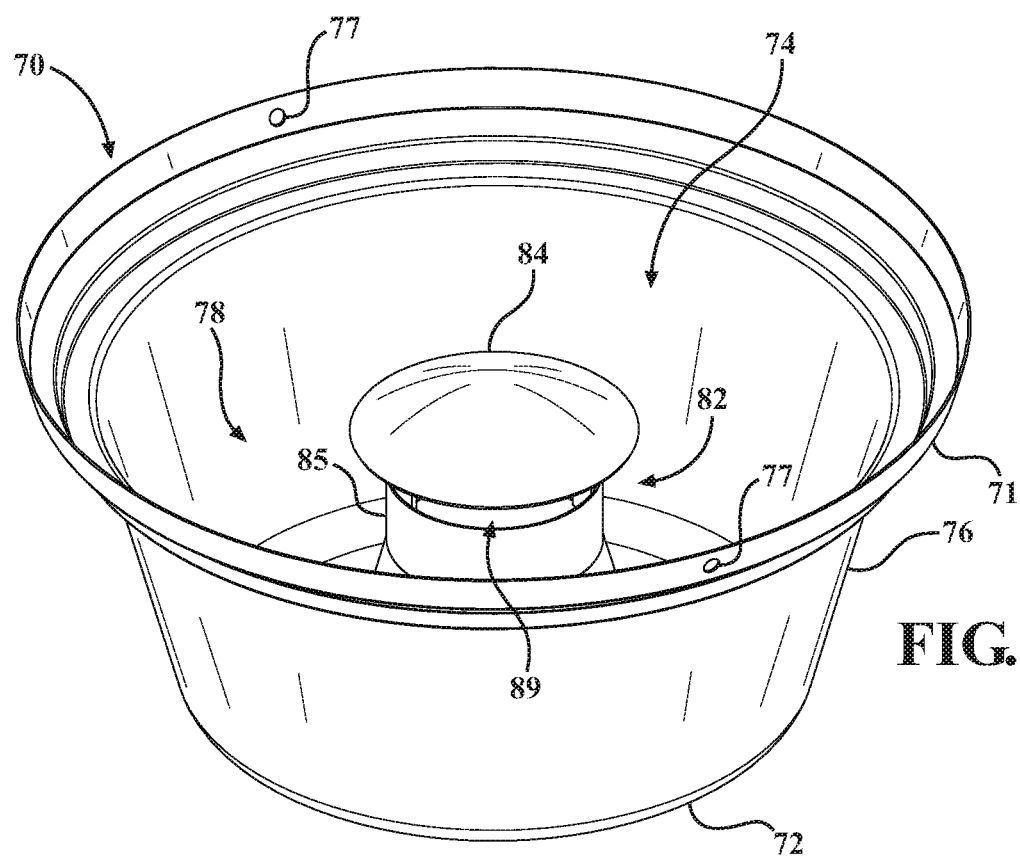
FIG. 6B is a second perspective view of the ash bucket of FIG. 6A.
Figure 6C:
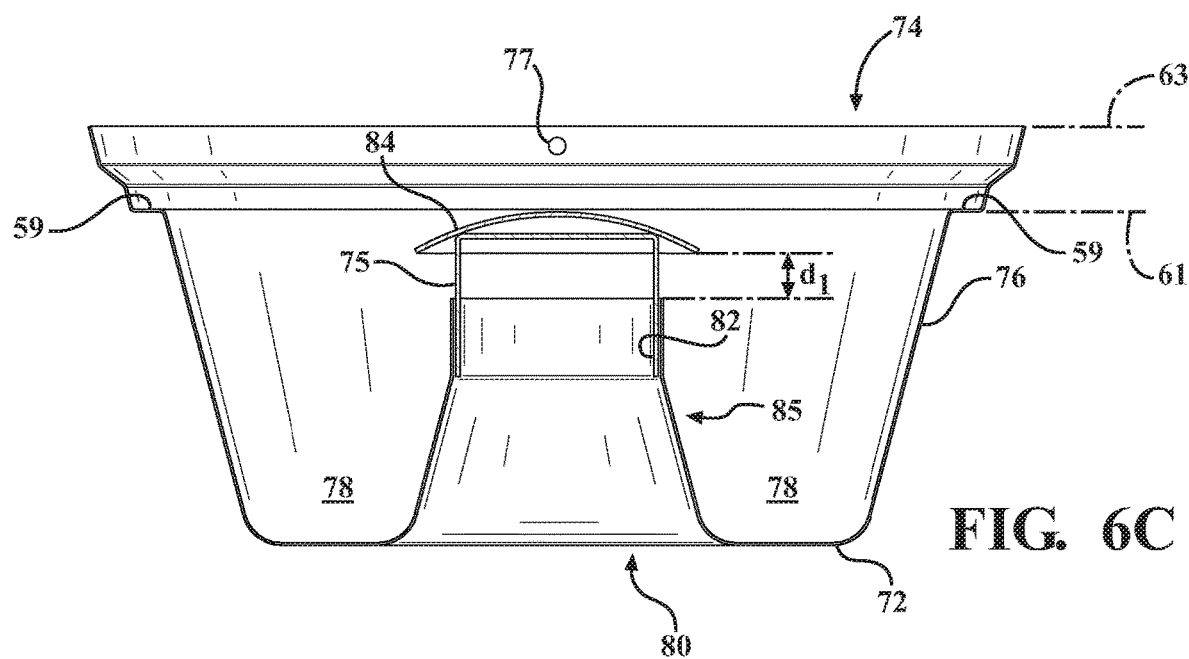
FIG. 6C is a cross-sectional view of the ash bucket of FIG. 6A.
Figure 6D:
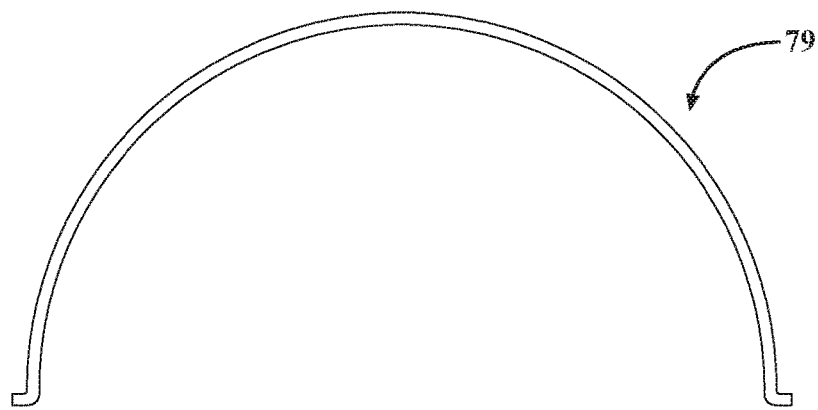
FIG. 6D is a view of a removable handle associated with the ash buck of FIG. 6A.
Figure 6E:
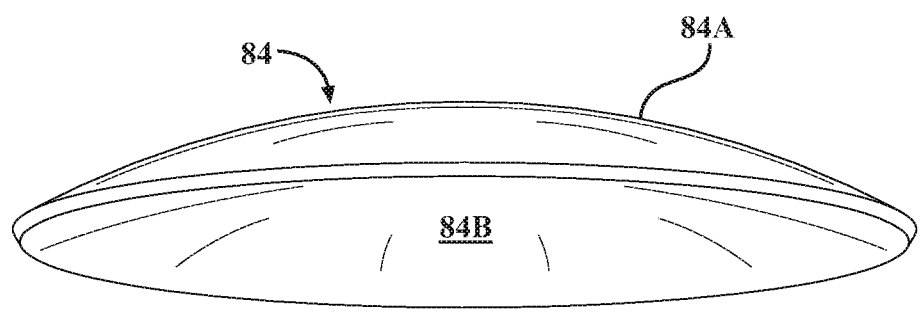
FIG. 6E is a first perspective view of a vent cover of the ash bucket of FIG. 6A.
Figure 6F:
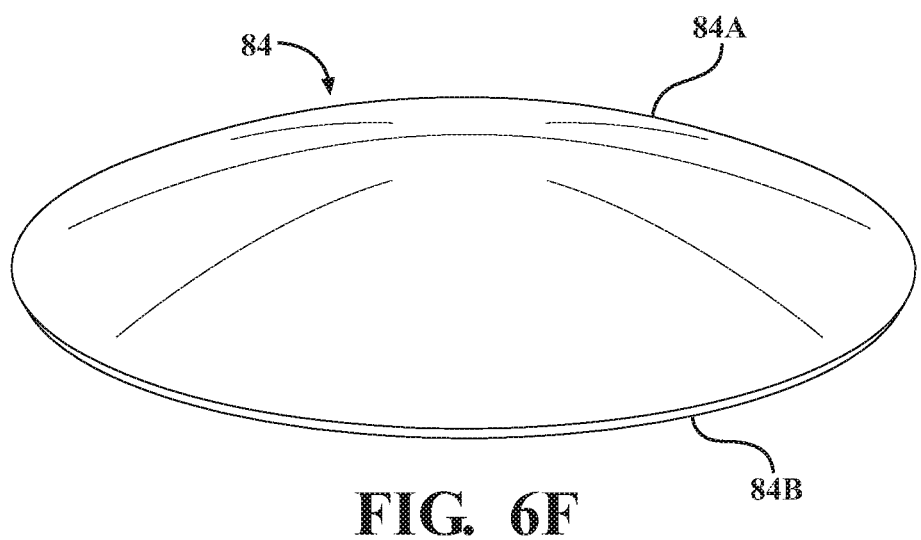
FIG. 6F is a second perspective view of the vent cover of FIG. 6B.
Figure 6G:
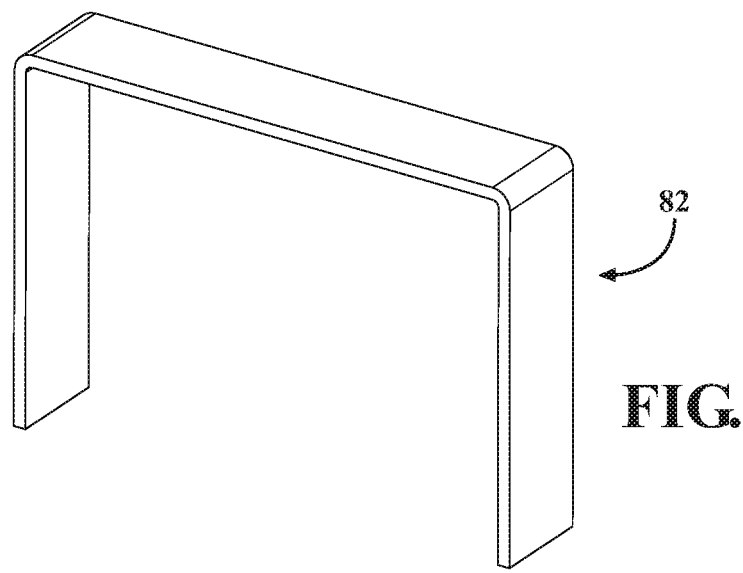
FIG. 6G is a perspective view of a vent bracket of the ash bucket of FIG. 6A.

Returning to FIG. 6C and as shown in FIG. 6G, a bracket 75 is coupled to the inside of the air vent 80. The vent cover 84 (see FIGS. 6E and 6F) has a curved upper surface 84A and a generally lower surface 84B. In use, the lower surface 84B of the vent cover 84 rests on an upper portion of the bracket 82. During the cooking process, ashes may fall from the cooking chamber 40 to the ash receptacle 78. Ashes the fall in the center of the grill 10 may land on the upper surface 84A of the vent cover 84 and then land within the ash receptacle, thus preventing, ashes from entering the bottom portion 14 of the grill 10. In the illustrated embodiment, the vent cover 84 is slightly curved, e.g., dome shaped. The bracket 75 is flat and the vent cover 84 is fixedly attached, e.g., welded, to the bracket 75 at the contact points.

In one embodiment, the ash bucket 70, bracket 75, removable handle 79, and vent cover 84 are composed from a metal, such as stainless steel. In a specific embodiment, the ash bucket 70, bracket 75, removable handle 79, and vent cover 84 are composed from 18/8 stainless steel or SAE 304 stainless steel.

In the illustrated embodiment, the lid portion 30 is coupled to the bottom portion 14 by a spring-biased hinge 86. In the illustrated embodiment, both the bottom portion 14 and the lid portion 30 are made from a ceramic material. As shown in FIGS. 3A-3E and FIGS. 4A-4C, the bottom portion 14 and the lid portion 30 include a respective channel 88, 90.

Figure 7A:
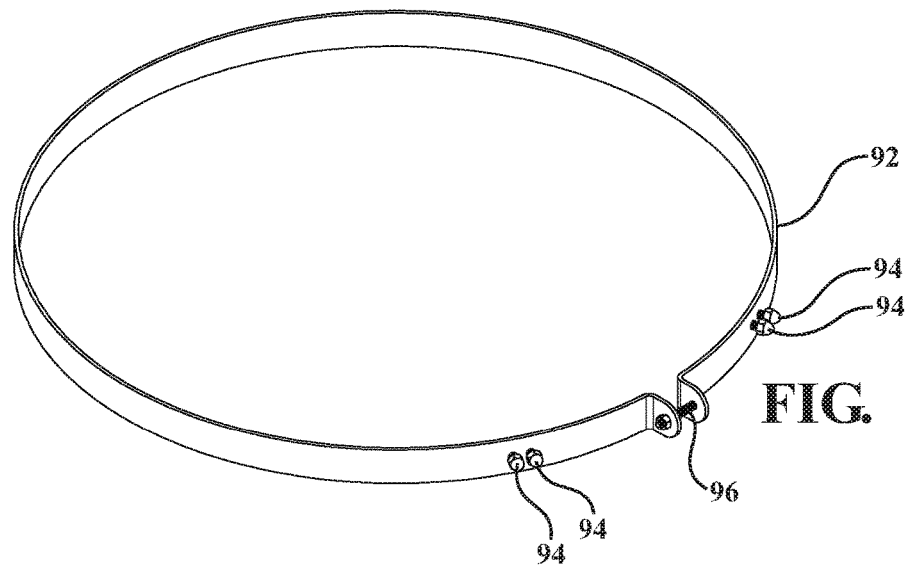
FIG. 7A is a perspective view of a ring associated with the bottom portion of the grill of FIG. 1A, according to an embodiment of the present invention.

With reference to FIG. 7A, the channel 88 in the bottom portion 14 is configured to receive a ring 92. The ring 92 provides structural support to the bottom portion 14 and allows other components to be mounted to the bottom portion 14. For example, in the illustrated embodiment, the hinge 86 is connected to the ring 92 using fasteners 94. Further, in the illustrated embodiment, the ring 92 as an open end which allows the ring 92 to be inserted over bottom upper opening 20 and into the channel 88. Once the ring 92 is positioned within the channel 88, the ring 92 may be tightened around the bottom portion 14 using an adjustment fastener 96

Figure 7B:
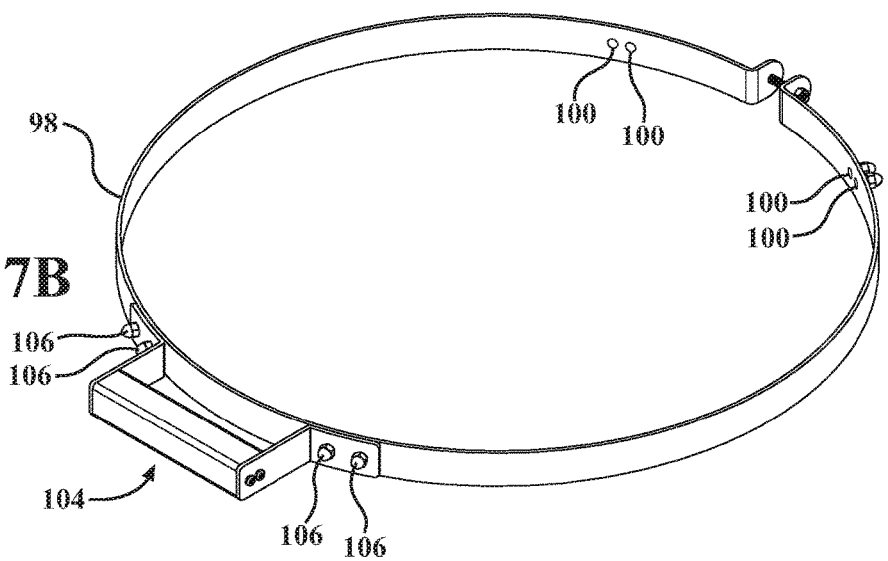
FIG. 7B is a perspective view of a ring associated with the lid portion of the grill of FIG. 1A, according to an embodiment of the present invention.
Figure 7C:
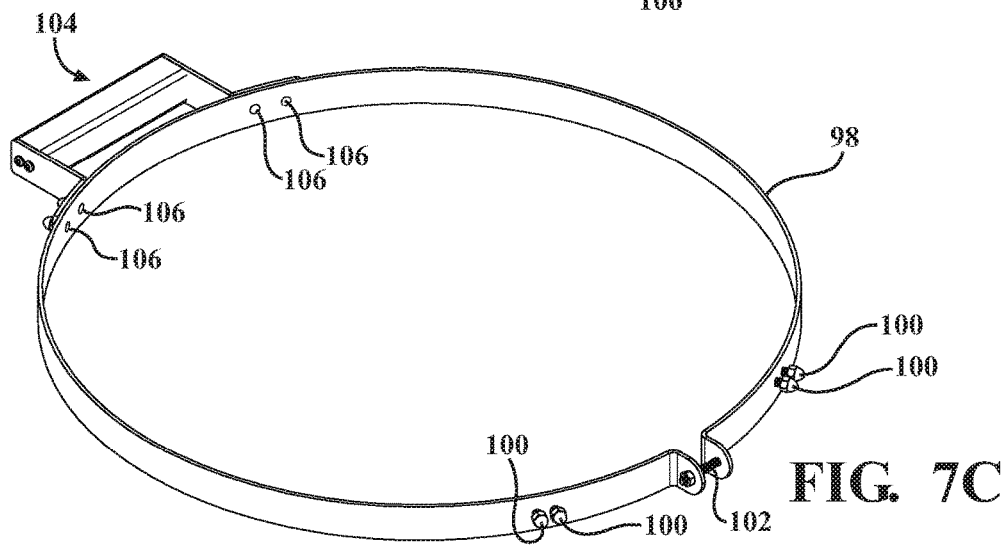
FIG. 7C is a second perspective view of the ring associated with the lid portion of FIG. 7B.
Figure 8:
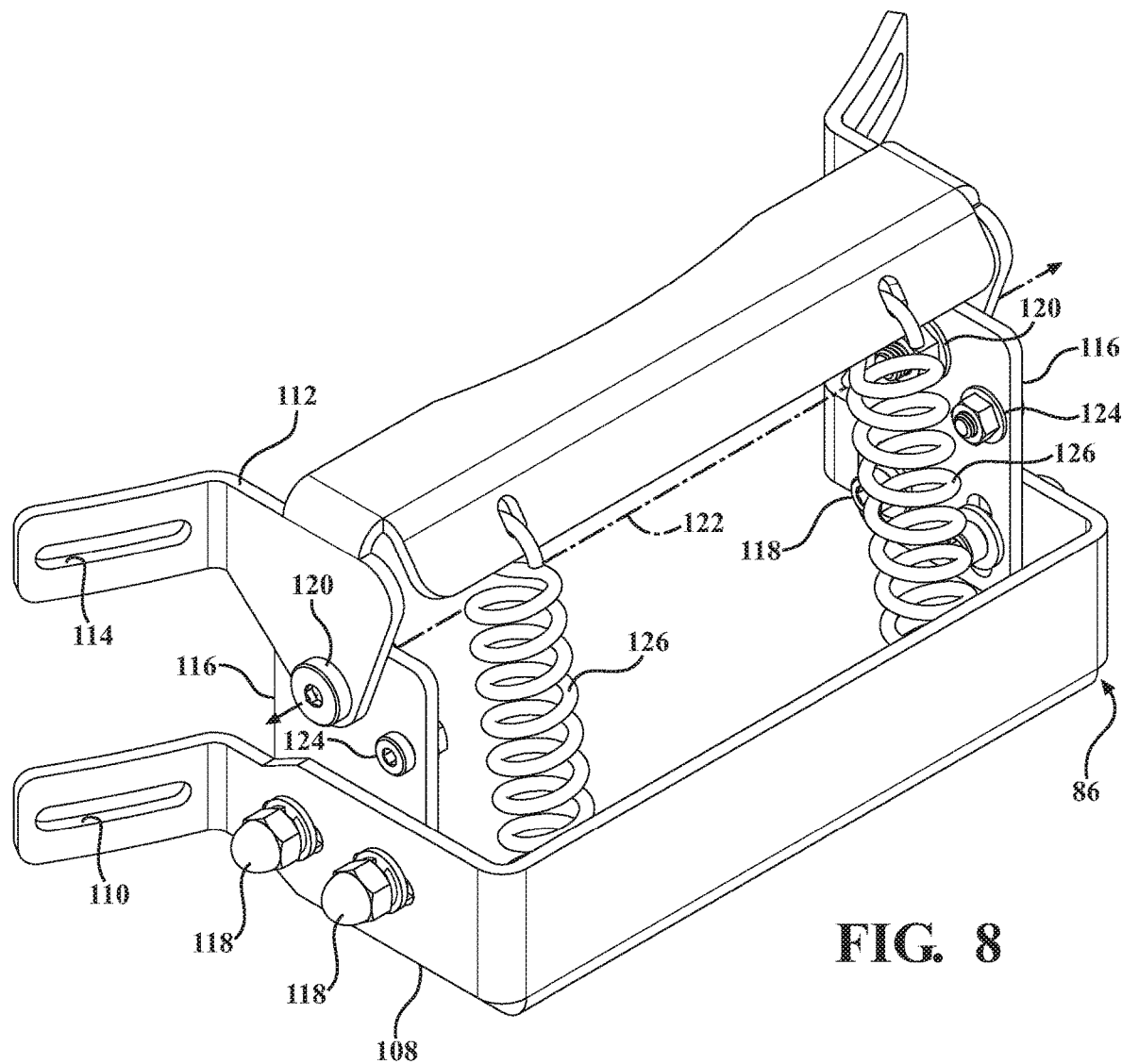
FIG. 8 is a perspective view of a hinge of the grill of FIG. 1A.
Figure 9A:
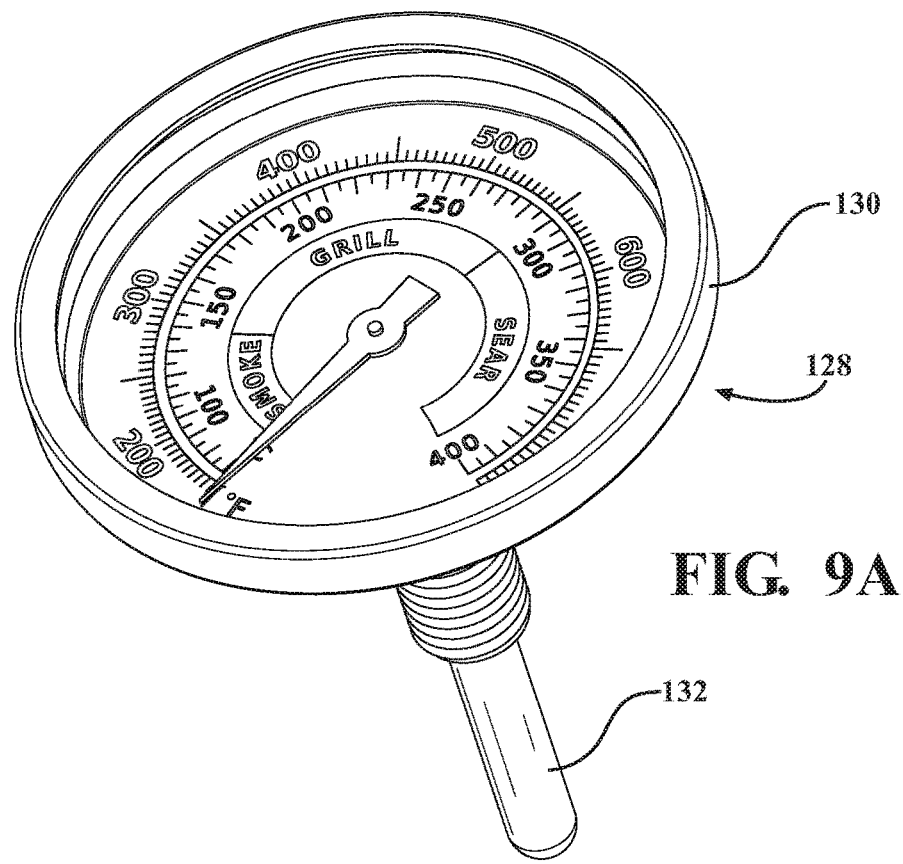
FIG. 9A is a perspective view of a thermometer of the grill of FIG. 1A.
Figure 9B:
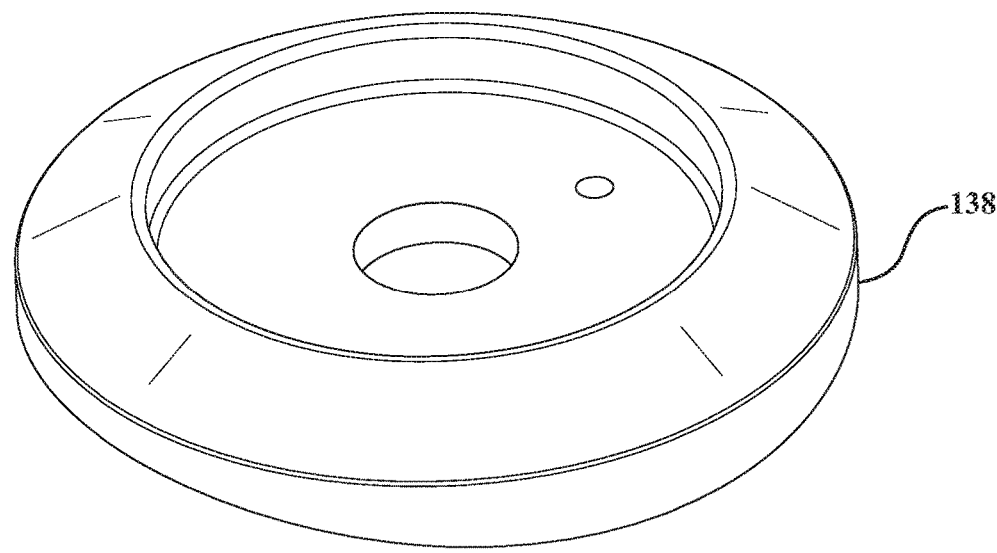
FIG. 9B is a perspective view of a thermometer bezel associated with the thermometer of FIG. 9A.

With reference to FIGS. 7B-7C, the channel 90 in the lid portion 30 is configured to receive a ring 98. The ring 98 provides structural support to the lid portion 30 and allows other components to be mounted to the lid portion 30. For example, in the illustrated embodiment, the hinge 86 is connected to the ring 98 using fasteners 100. Further, in the illustrated embodiment, the ring 98 as an open end which allows the ring 98 to be inserted over lid lower opening 36 and into the channel 90. Once the ring 98 is positioned within the channel 90, the ring 98 may be tightened around the lid portion 30 using an adjustment fastener 102.

In one embodiment, the rings 92, 98 are composed from a metal, such as stainless steel. In a specific embodiment, the rings 92, 98 are composed from 18/8 stainless steel or SAE 304 stainless steel.

Further, as shown in FIGS. 1A, 1B and 7B-7C, a handle 104 may also be coupled to the ring 98 using fasteners 106. The handle 104 allows the grill 10 to be opened, i.e., the lid portion 30 to lifted relatively to the bottom portion 14 and rotated about the hinge 86. In one embodiment, handle 104 may be made from a combination of metal and wood. The metal may be stainless steel, such as 18/8 stainless steel or SAE 304 stainless steel.

With reference to FIGS. 1A, 1C-1G and FIG. 8, an exemplary hinge 86 includes a lower hinge bracket 108 and an upper hinge bracket 110. The lower hinge bracket 108 is coupled to the ring 92 via the fasteners 94 which are inserted through lower hinge bracket slots 110 (only one of which is shown). The exemplary hinge also includes an upper hinge bracket 112. The upper hinge bracket 112 is coupled to the ring 98 via the fasteners 100 which are inserted through upper hinge bracket slots 114 (only one of which is shown). The upper and lower hinge brackets 108, 112 are connected via two hinge support brackets 116. The hinge support bracket 116 are fixedly coupled to the lower hinge bracket 108 via fasteners 118. The upper hinge bracket 112 is rotatably coupled to the support brackets 116 via fasteners 120. The upper hinge bracket 112 (and the lid portion 30) rotates about an axis 122 defined by a center of the fasteners 120. A pair of fasteners 124 on the hinge support brackets 116 serves as stops which prevent the lid portion to move past a fully open position. The exemplary hinge 86 may also include a pair of motion assist springs 126 connected between the lower and upper hinge brackets 108, 112. The hinge 86 is generally composed of metal. For example, at least the lower and upper hinge brackets 108, 112 and the support brackets 116 may be composed from stainless steel, such as 18/8 stainless steel or SAE 304 stainless steel.

With reference to FIGS. 1A-1D, 1F, 2B, 9A and 9B, a thermometer 128 may be provided in the lid portion 30. As shown, the thermometer 128 may include a gauge indicator 130 and a stem 132. The gauge indicator 130 provides information to the user, e.g., temperature and cooking status. The stem 132 is inserted through a first aperture 134 (see FIG. 4A) in the lid portion 30. A second aperture 136, adjacent the first aperture 134, may receive a locating extension (not shown) located on the back to the gauge indicator 130 to orient the gauge indicator 130 in an upright orientation. The stem 132 may be threaded to allow the gauge indicator 130 to be secured to the lid portion 30 by a nut (not shown). A bezel 138 may be located between the gauge indicator 130 and the lid portion 30 to provide a finished look.

Returning FIGS. 2B and 6A-6C, the first air path 62 is defined by the air vent 80, the upper vent aperture 82 and the vent cover 84. In the illustrated embodiment, the first air path 62 originates outside of the grill 10 and enters the internal bottom cavity 22 of the bottom portion 14 via a lower vent assembly 160. The lower vent assembly 160 is discussed in further depth below. Once air enters the internal bottom cavity 22, air may follow the first path 62, entering the air vent 80 and out the upper vent aperture 82 as shown. As best shown in FIGS. 2A and 5A-5D, the firebox 50 may include a plurality of apertures 140 spaced about a periphery of the firebox side wall 58. The apertures 140 provide a secondary air path 63, from the internal bottom cavity 22 into the internal cavity of the firebox 50 (or the hear chamber 64).

Figure 2B:
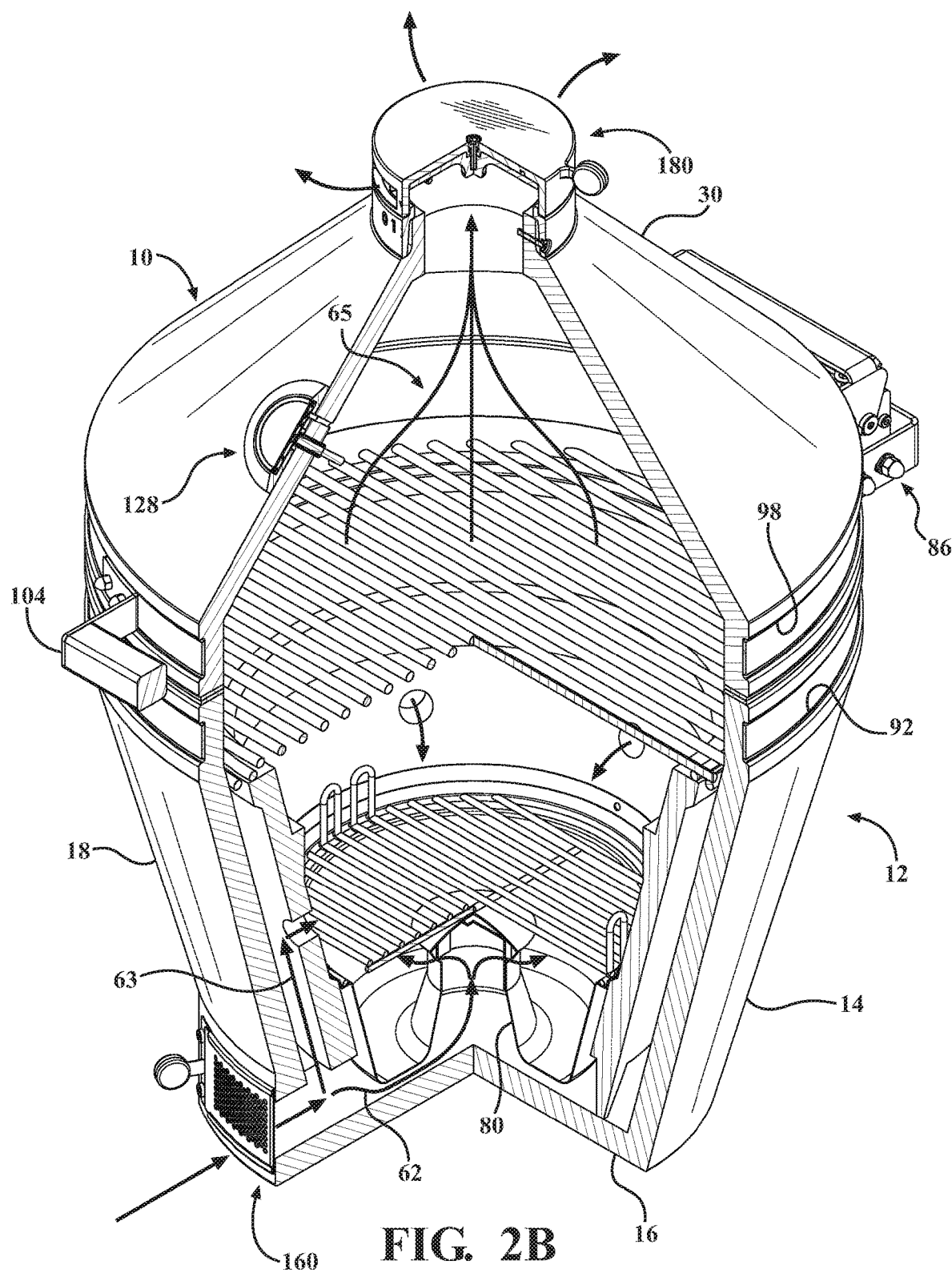
FIG. 2B is a cut-away view of the grill shown in FIG. 1A.
Figures 3A, 3B:
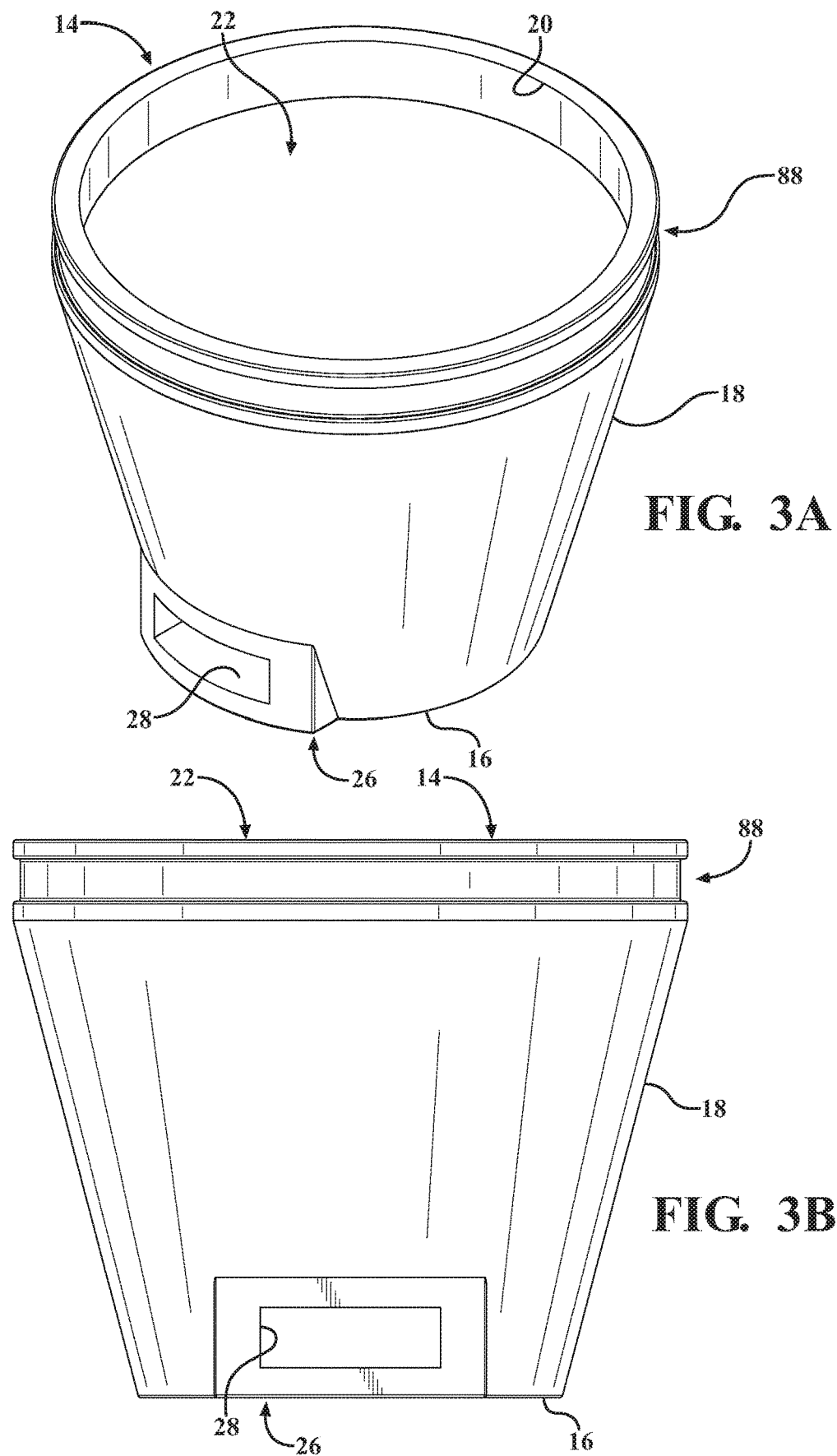
FIG. 3A is a perspective view of the bottom portion of the grill of FIG. 1A, according to an embodiment of the present invention.
FIG. 3B is a front view of the bottom portion of the grill of FIG. 3A.
Figure 3C:
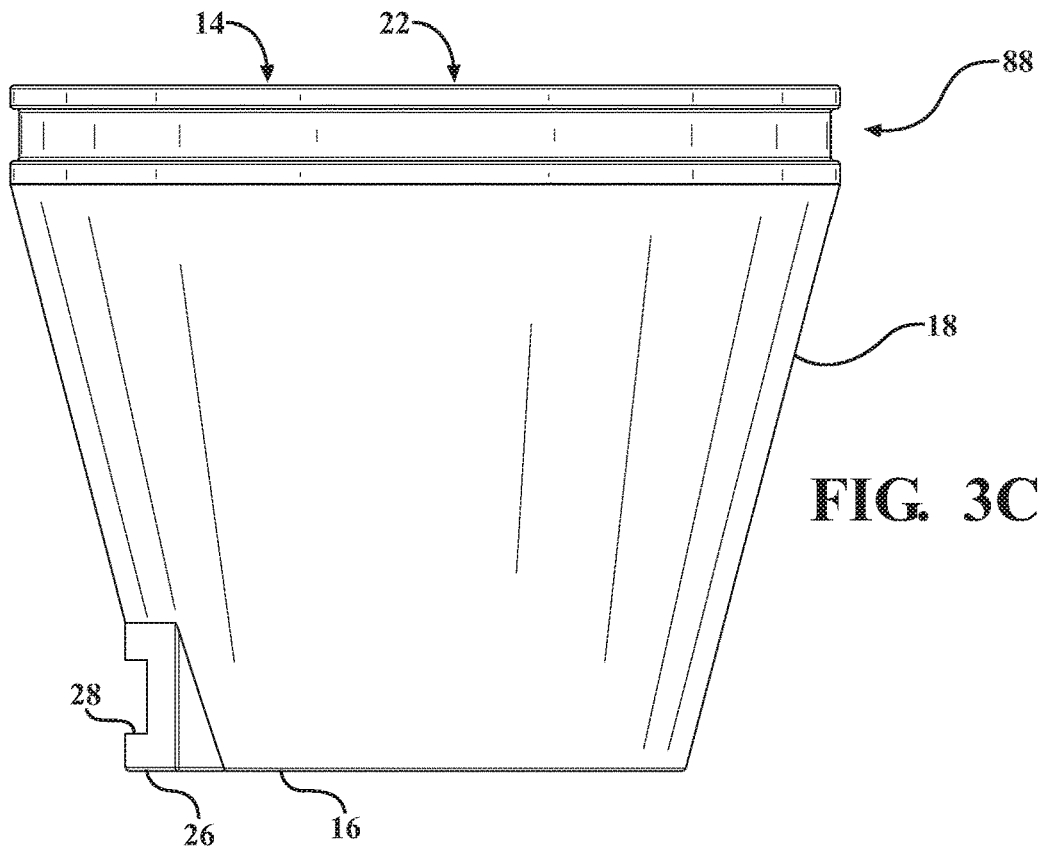
FIG. 3C is a side view of the bottom portion of the grill of FIG. 3A.
Figure 3D:
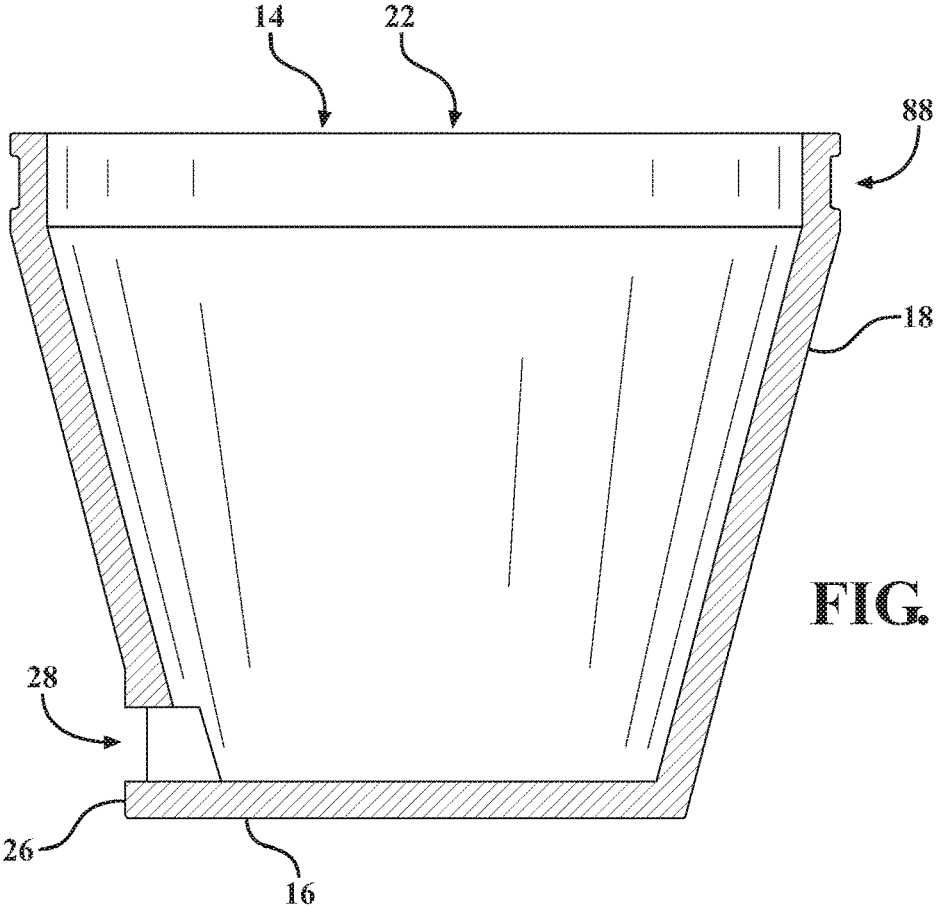
FIG. 3D is a first cross-sectional view of the bottom portion of the grill of FIG. 3A.
Figure 3E:
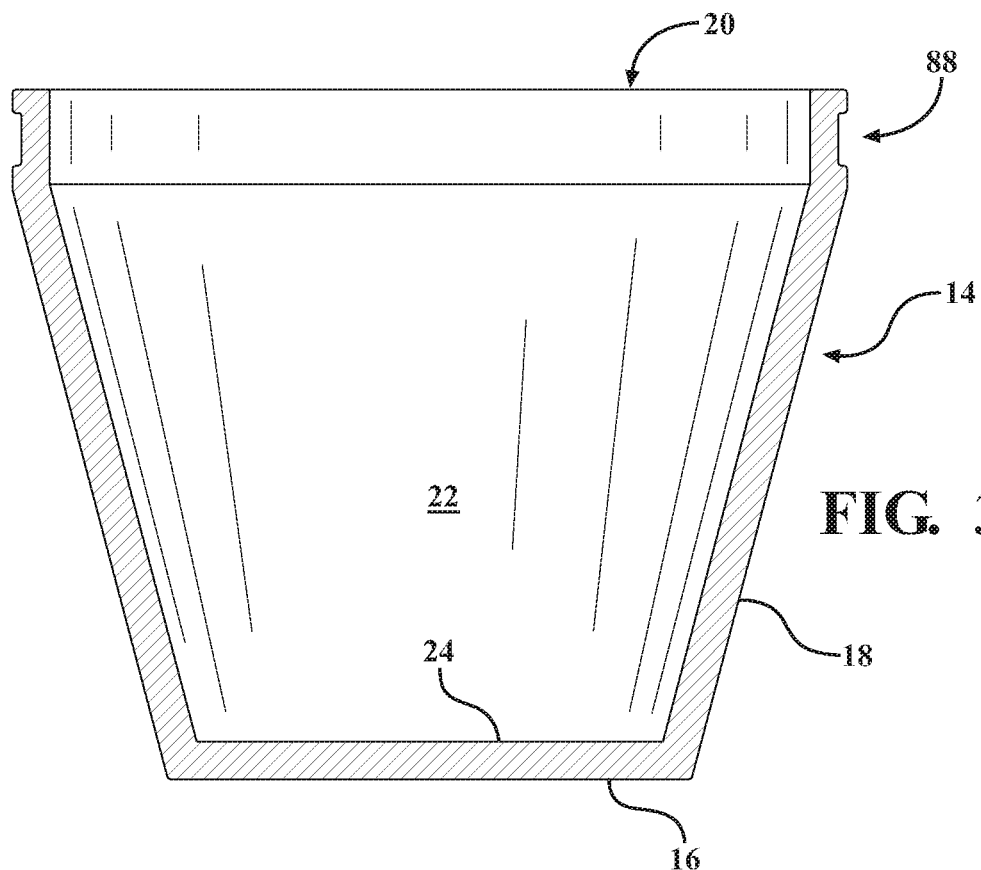
FIG. 3E is a second cross-sectional view of the bottom portion of the grill of FIG. 3A.
Figure 4A:
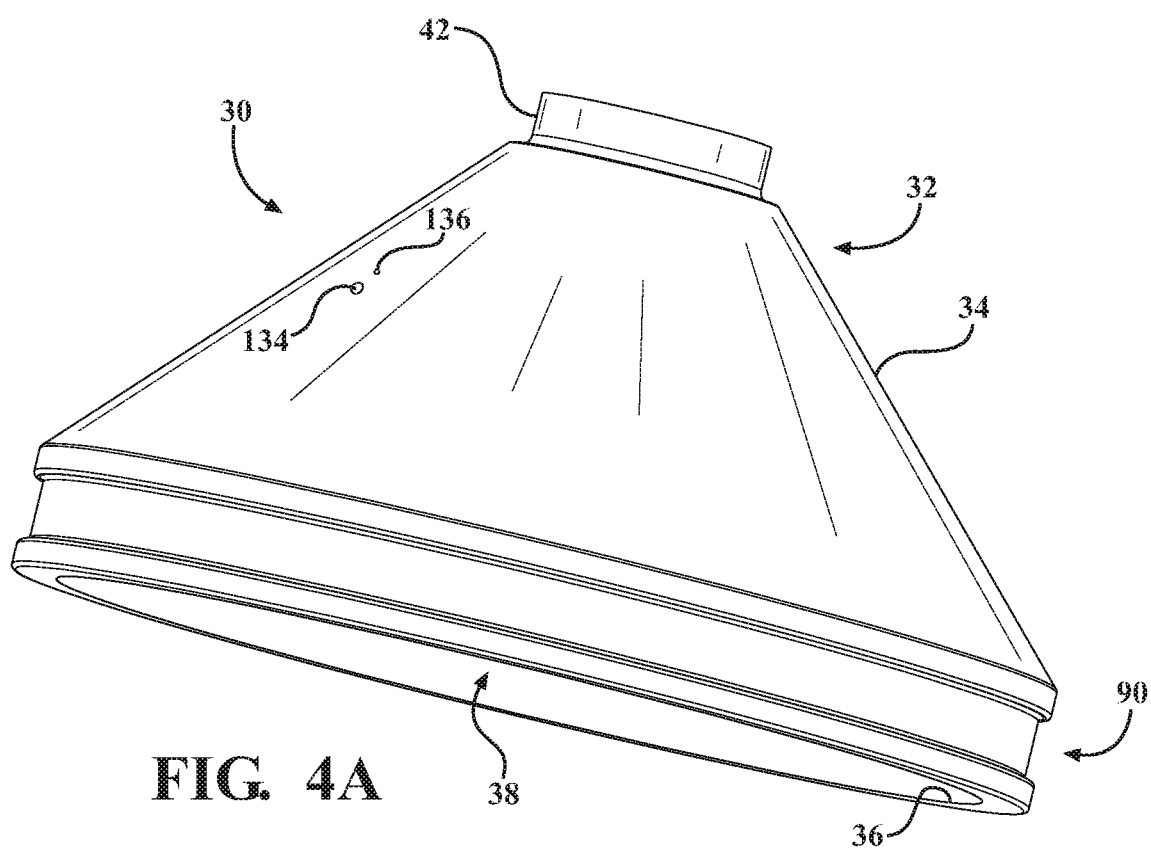
FIG. 4A is a perspective view of the lid portion of the grill of FIG. 1A, according to an embodiment of the present invention.
Figure 4B:
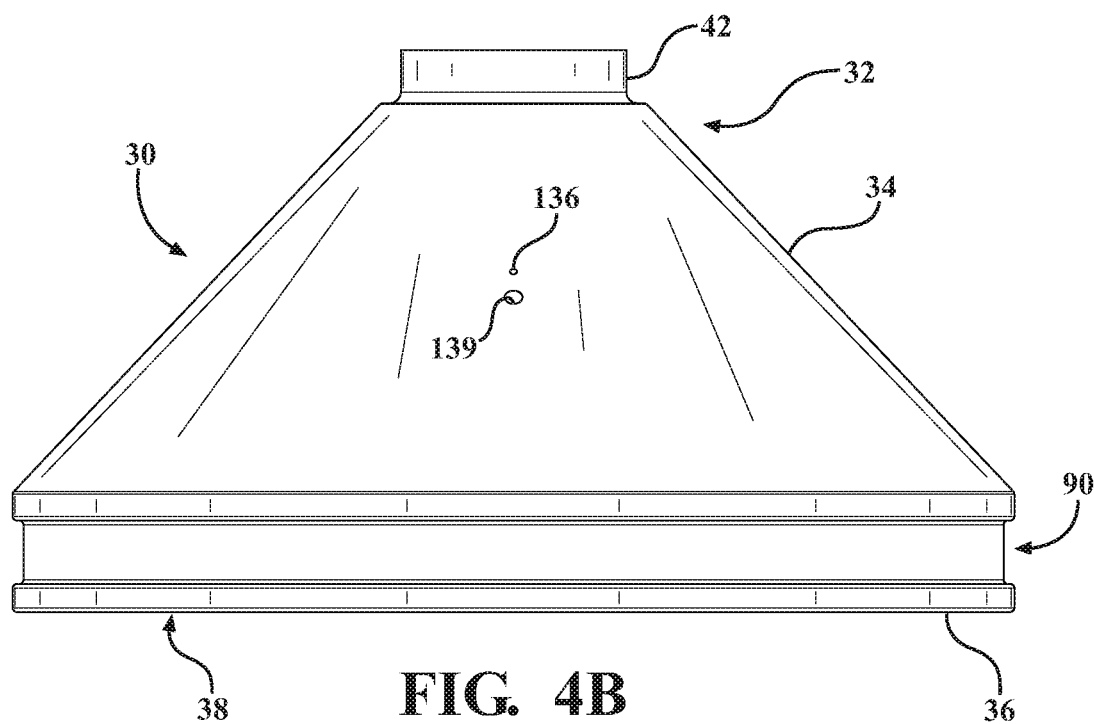
FIG. 4B is a front view of the lid portion of the grill of FIG. 4A.
Figure 4C:
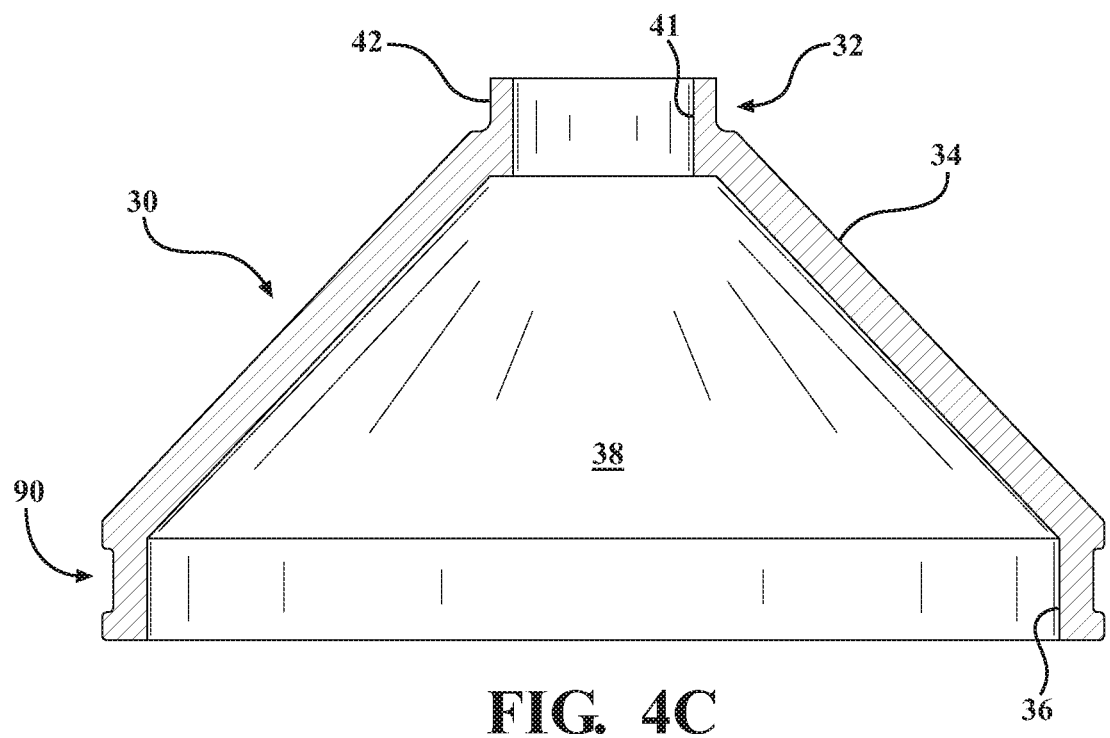
FIG. 4C is a cross-sectional view of the lid portion of the grill of FIG. 4A.
Figure 5A:
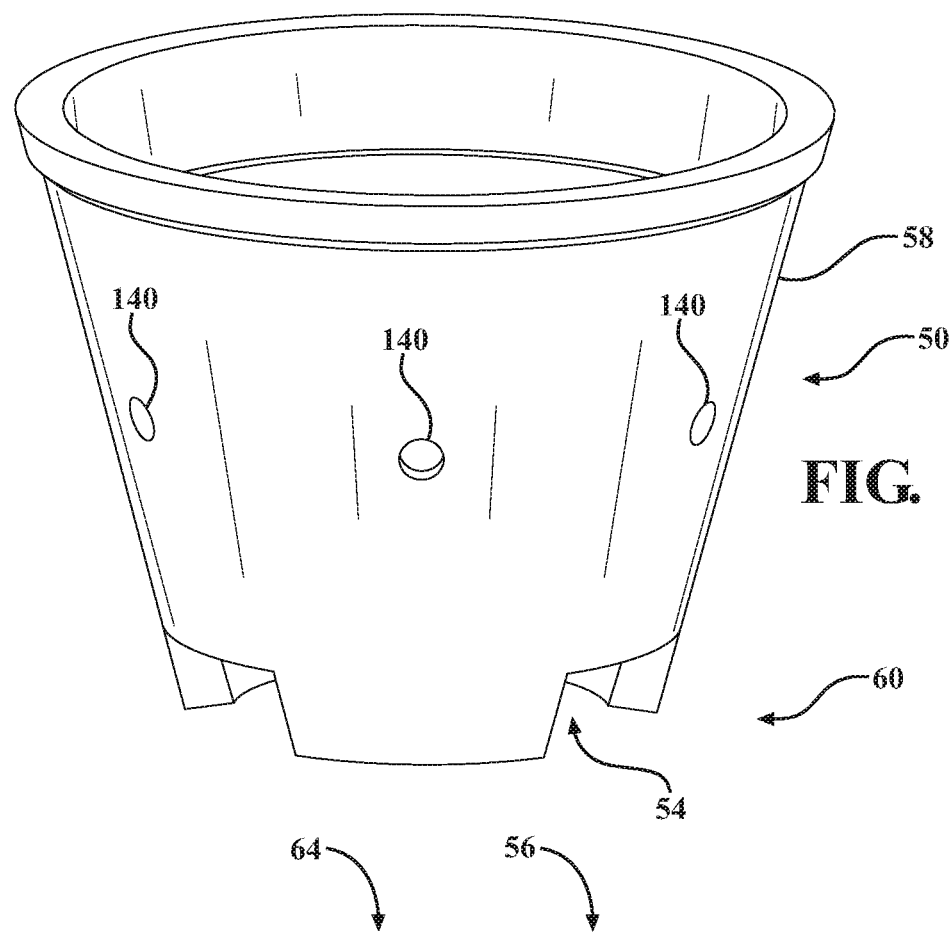
FIG. 5A is a perspective view of a firebox of the grill of FIG. 1A, according to an embodiment of the present invention.
Figure 5B:
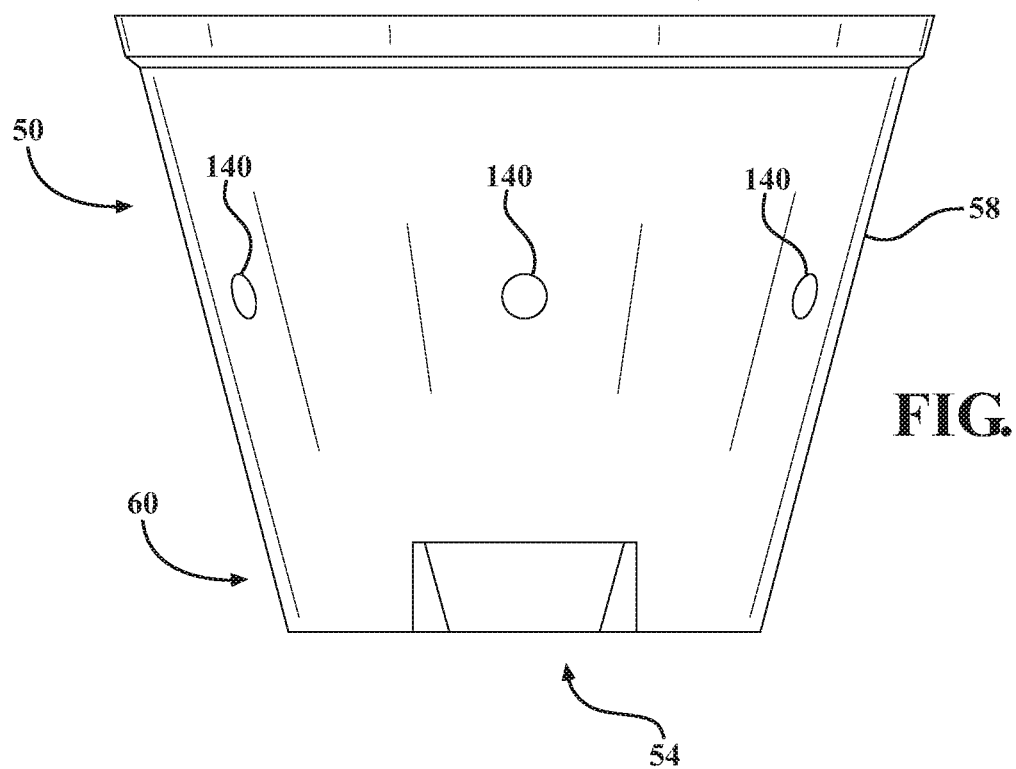
FIG. 5B is a front view of the firebox of FIG. 5A.
Figure 5C:
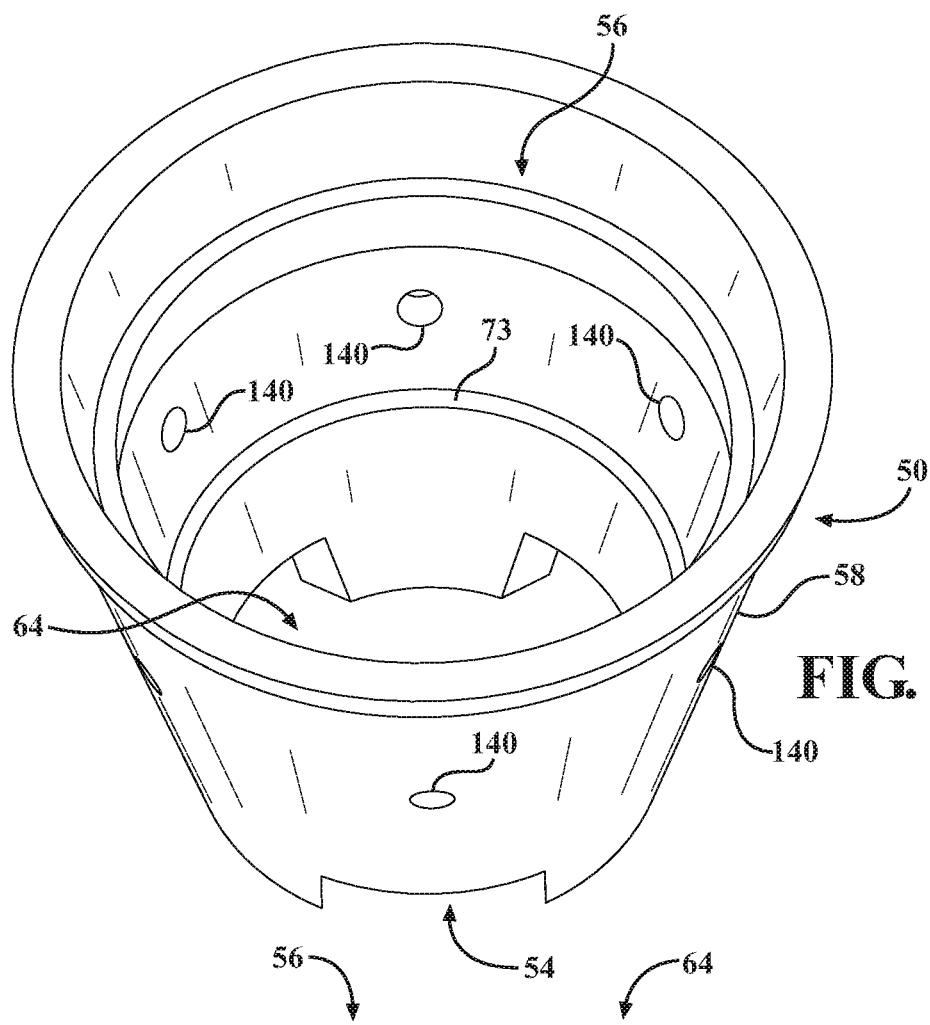
FIG. 5C is a second perspective view of the firebox of FIG. 5A.
Figure 5D:
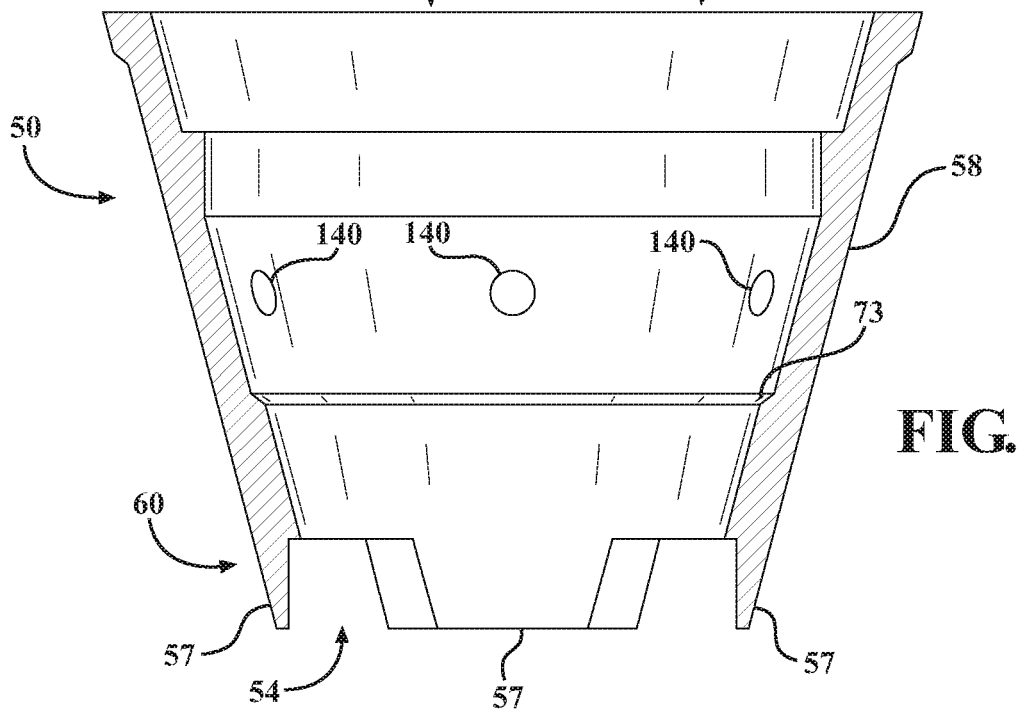
FIG. 5D is a cross-sectional view of the firebox of FIG. 5A.

As shown in FIGS. 2B, 6C, and 12A the grill 10 may include a fuel grate 142. The fuel grate 142 is removable and, in use, rests on a ledge or fuel grate lip 59 formed on an inner surface of the ash bucket side wall 76. In the illustrated embodiment the fuel grate lip 59 is adjacent the ash bucket upper opening 74. As shown, the fuel grate lip 59 defines a lip plane 61 and the ash bucket upper opening 74 defines an ash bucket upper opening plane 63. The lip plane 61 is closer to the ash bucket base 72 than the ash bucket upper opening plane 63. In use, fuel, for example, charcoal is positioned on the fuel grate 142 and ignited. Oxygen to the burning fuel is provided via the first and second airpaths, 62, 63. A plurality of u-shaped handles 144 may be provided on the fuel grate 142 to allow a user to grasp and remove the fuel grate 142 from the grill.

As shown in FIGS. 2B and 12B, a cooking grate or grill 146 may be positioned above the fuel grate 142. In the illustrated embodiment, the cooking grate or grill 146 may rest on an upper lip of the firebox 50.

In one embodiment, the fuel grate 142 and the cooking grate 146 are composed from a metal, such as stainless steel. In a specific embodiment, the fuel grate 142 and the cooking grate 146 are composed from 18/8 stainless steel or SAE 304 stainless steel.

Figure 12C:
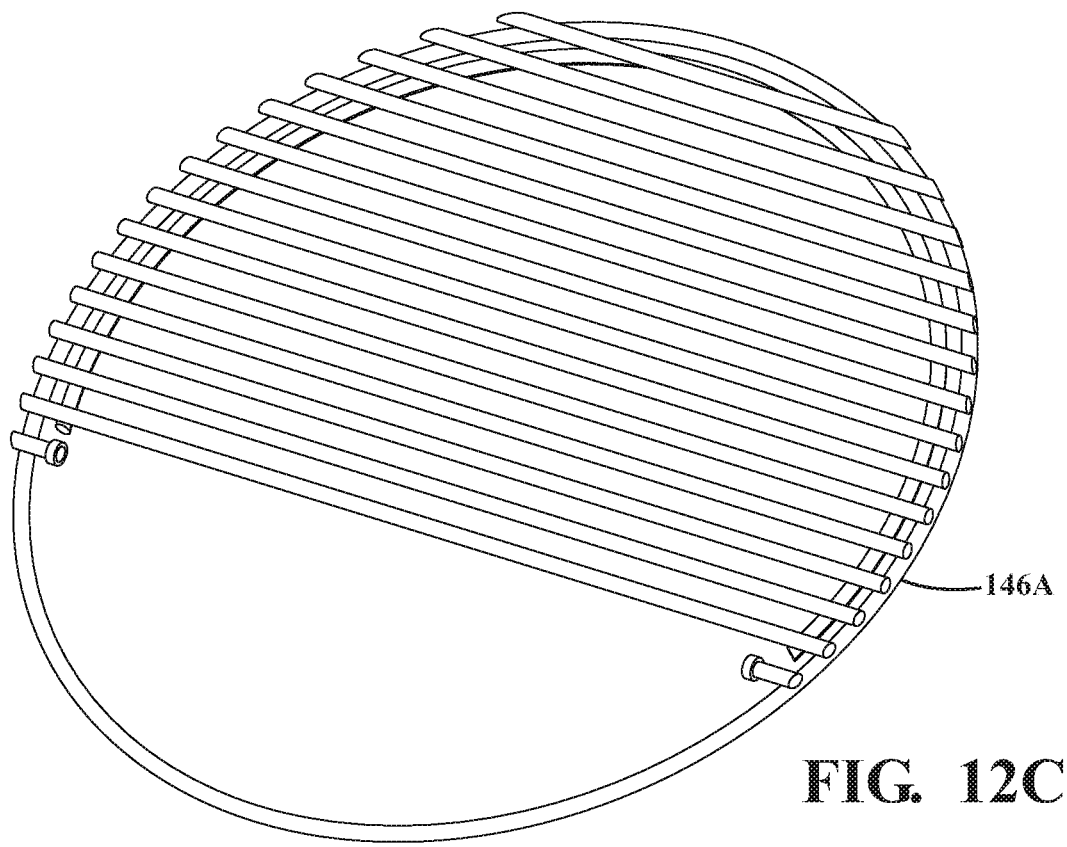
FIG. 12C is a perspective view of a first portion of the cooking grate of FIG. 12B.
Figure 12D:
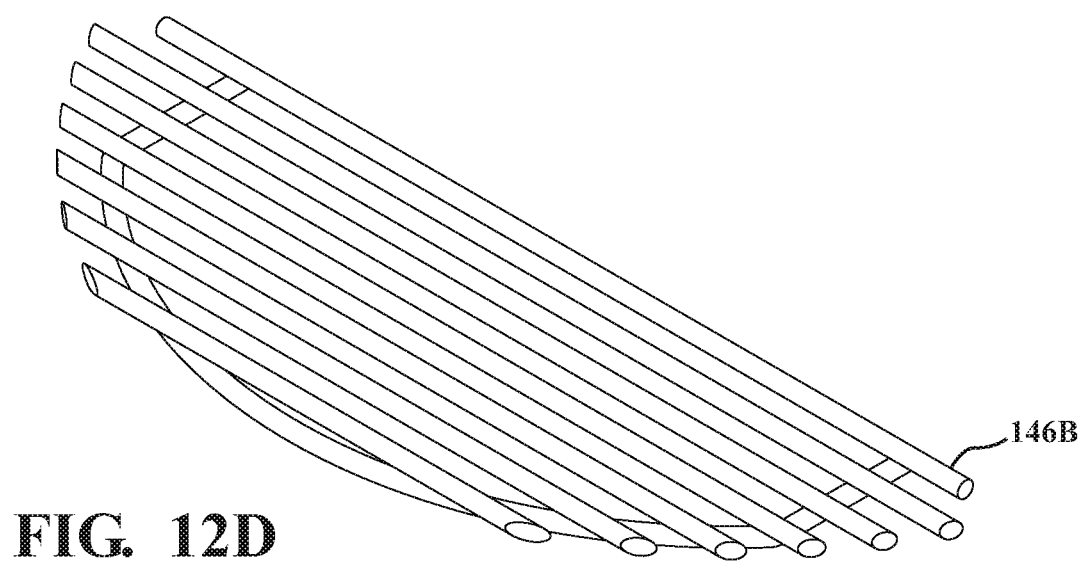
FIG. 12D is a perspective view of a second portion of the cooking grate of FIG. 12B.

As shown in FIGS. 12C and 12D, in the illustrated embodiment, the cooking grate 146 may include a first cooking grate portion 146A and a second cooking grate portion 146B. The second cooking grate portion 146B is rotatably attached to the first cooking grate portion 146A to allow the user to lift the second cooking grate portion 146B (during cooking) to add fuel to the grill 10 without removing the entire cooking grate 146.

Figure 13A:
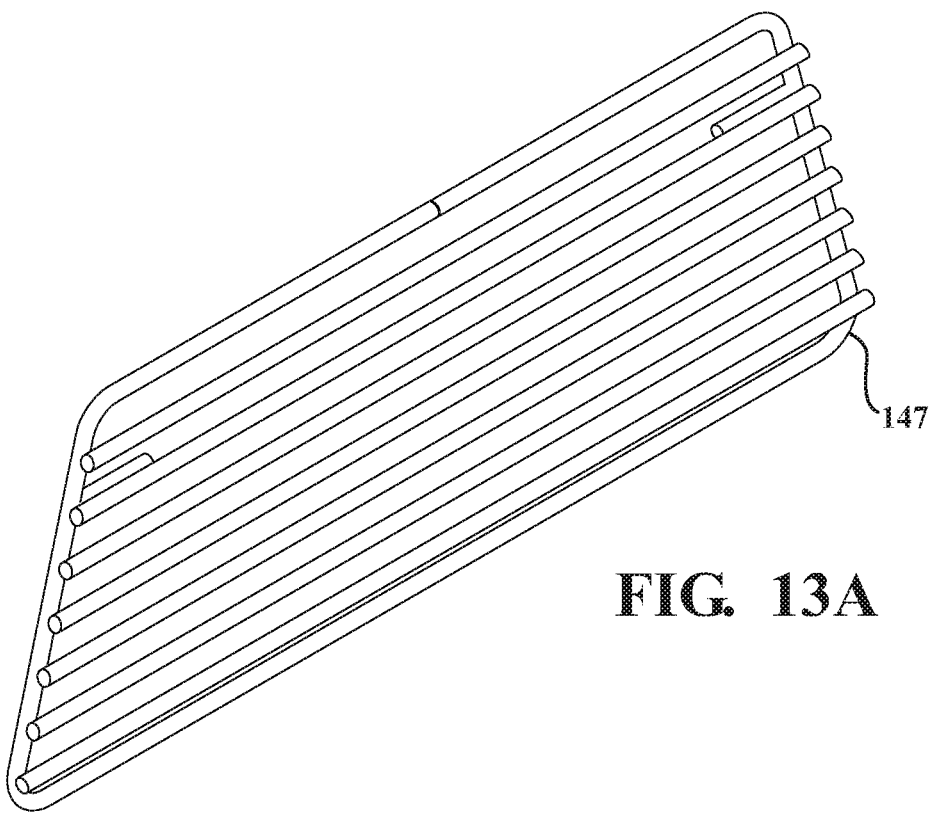
FIG. 13A is a first perspective view of a divider of the grill of FIG. 1A.
Figure 13B:
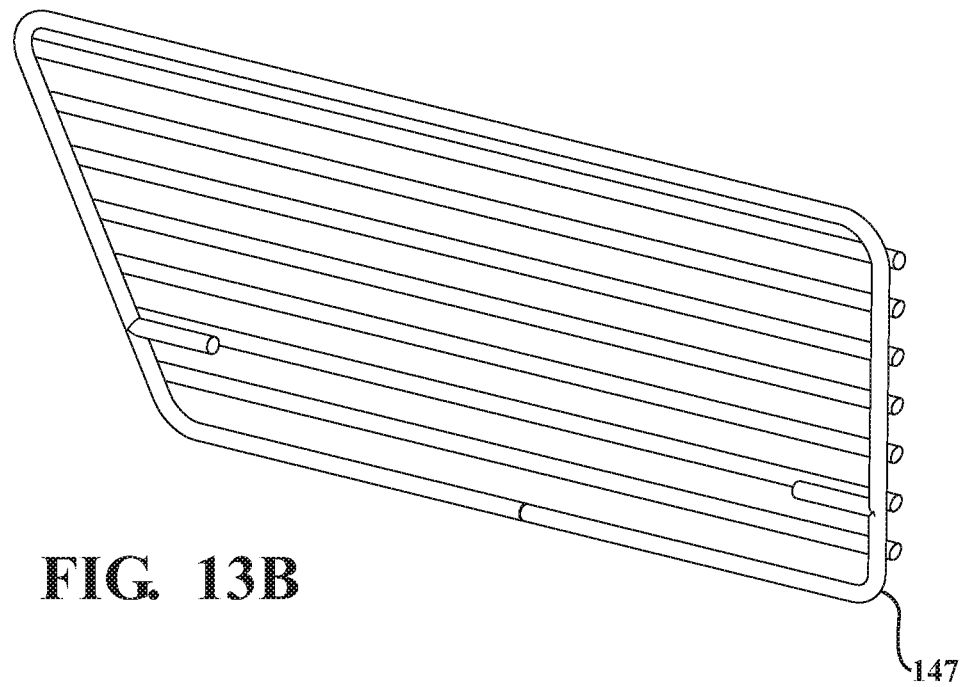
FIG. 13B is a second perspective view of the divider of FIG. 13A.
Figure 14B:
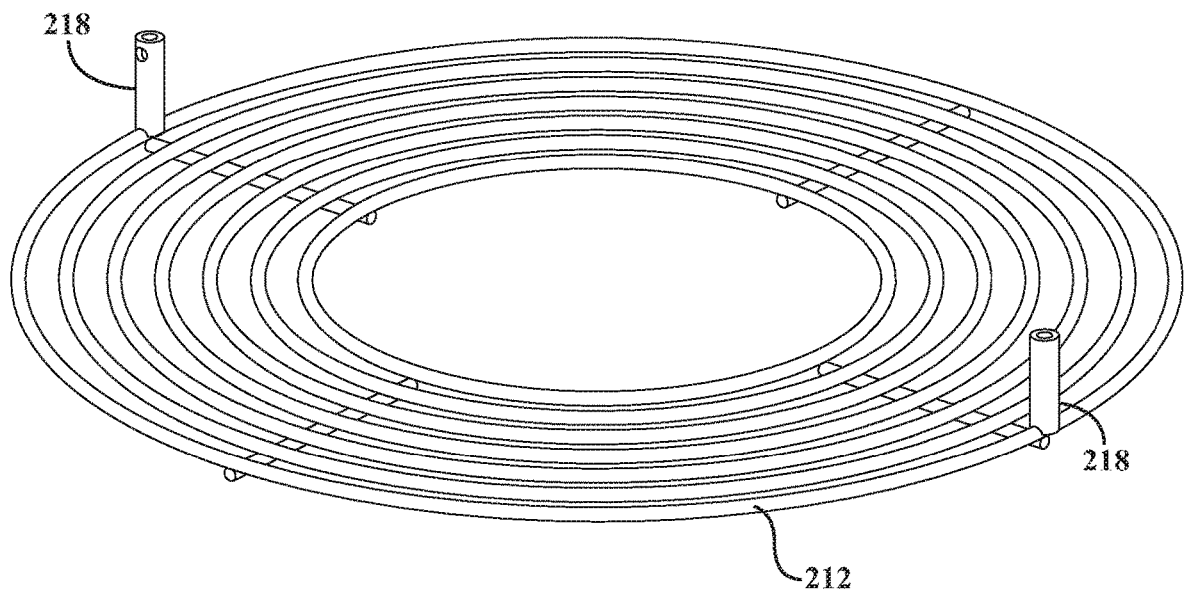
FIG. 14B is a perspective view of an outer grill of the cooking accessory of FIG. 14A.
Figure 14C:
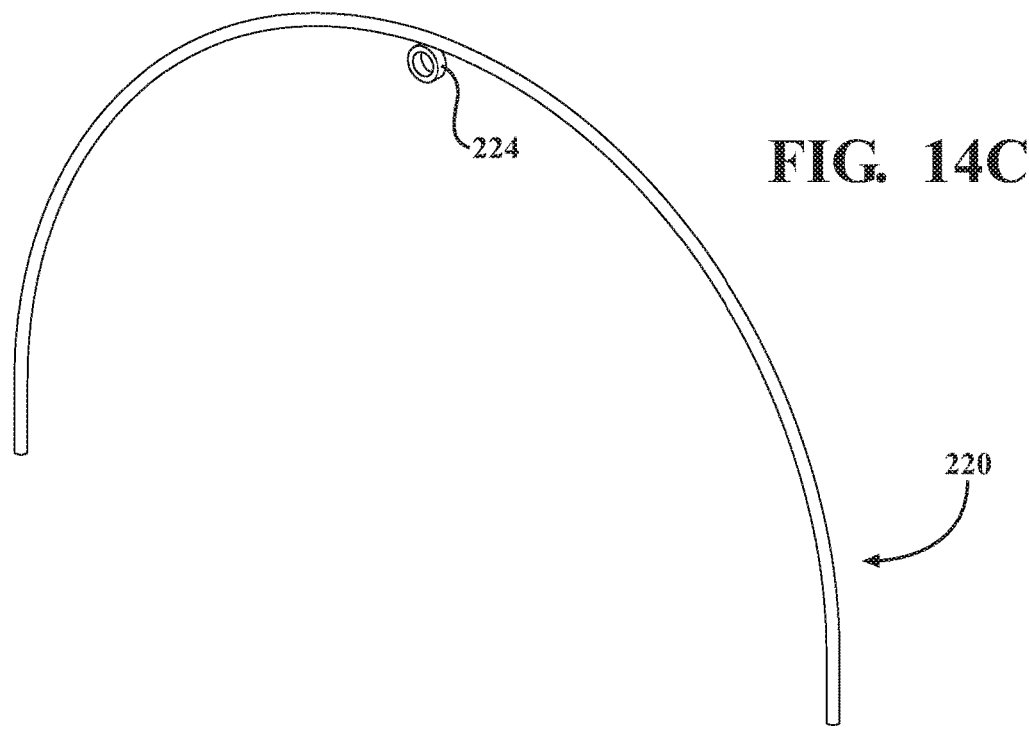
FIG. 14C is a perspective view of a hanger of the cooking accessory of FIG. 14A.
Figure 14D:
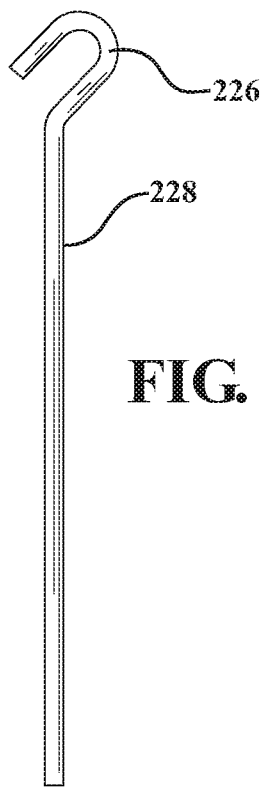
FIG. 14D is a perspective view of a hook of the cooking accessory of FIG. 14A.
Figure 14E:
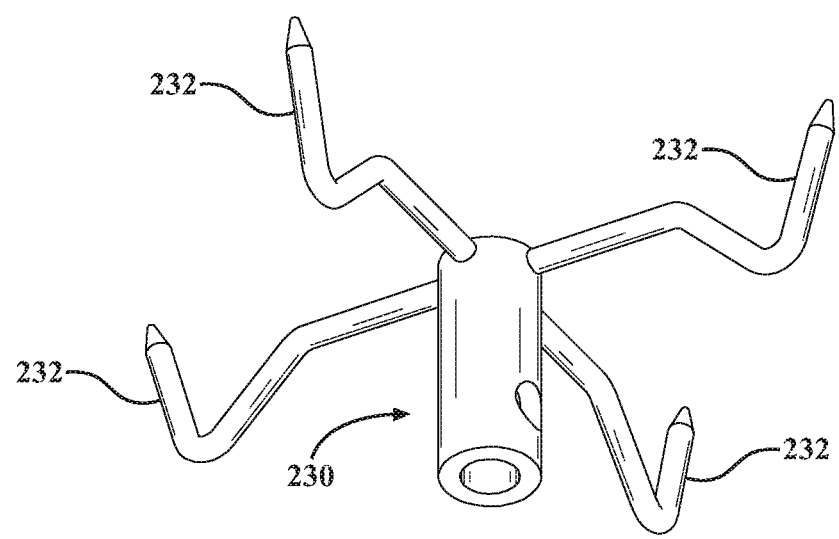
FIG. 14E is a perspective view of a cooking device of the cooking accessory of FIG. 14A; and, FIG. 14F is a plate of the cooking accessory of FIG. 14A.
Figure 14F:
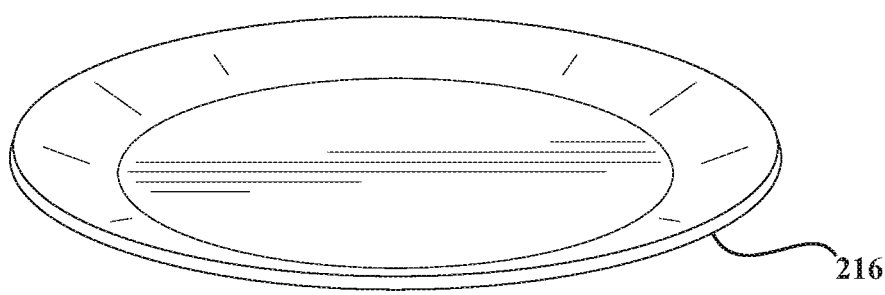
FIG. 14A is a perspective view of a cooking accessory of the grill of FIG. 1A.

As shown in FIGS. 13A and 13B, the grill 10 may include a divider 147 that may be placed vertically within the grill 10 above the fuel grate 142 to allow the user to only add fuel on one side of the fuel grate.

Returning to FIG. 2B, rising air from the burning fuel passes over/through the cooking grate 146 (and around any food thereon). As shown, the rising air follows airpaths 65 and exits the grill 10 via an upper vent assembly 180.

Figure 10A:
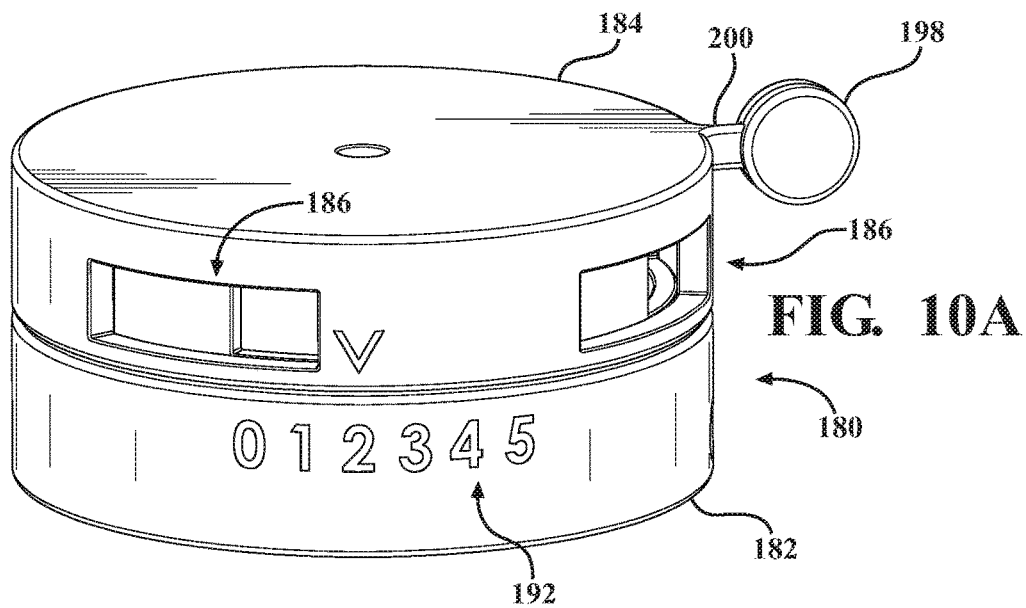
FIG. 10A is a perspective view of an upper air vent, according to an embodiment of the present invention.
Figure 10B:
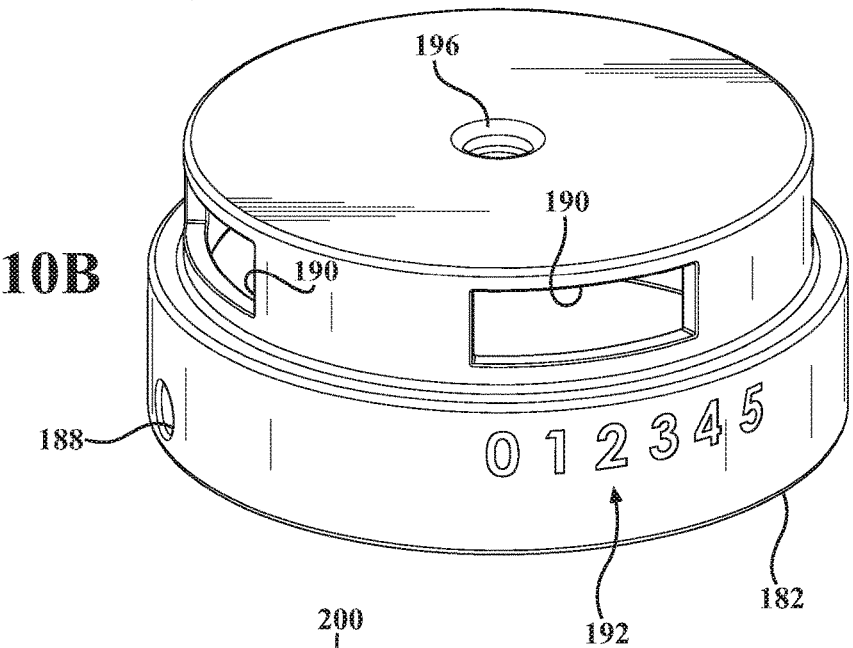
FIG. 10B is a perspective view of a first portion of the upper air vent of FIG. 10A.

With reference to FIGS. 10A-10B, in the illustrated embodiment, the upper vent assembly 180 includes a first vent part 182 and a second vent part 184 which form a plurality of adjustable orifices 186. In the illustrated embodiment, the upper vent assembly 180 includes four orifices 186 spaced about a periphery of the upper vent assembly 180, although, any number of orifices 186 may be provided. The first vent part 182 may be fixedly coupled to a stack 42 formed at the top of the lid portion 30 via a fastener (not shown) through orifice 188. The stack 42 has a lid upper (or stack) opening 44 (see FIGS. 4A-4C) which allows air to enter the upper vent assembly 180. The first and second vent parts 182, 184 may be generally composed of metal. For example, the first and second vent parts 182, 184 may be composed from stainless steel, such as 18/8 stainless steel or SAE 304 stainless steel.

With particular reference to FIG. 10B, in the illustrated embodiment, the first vent part 182 includes a plurality of rectangular interior vent apertures 190 underneath at least one of the interior vent apertures 190, a plurality of indicia 192 which may provide an indication of size of the orifices 186.

Figure 10C:
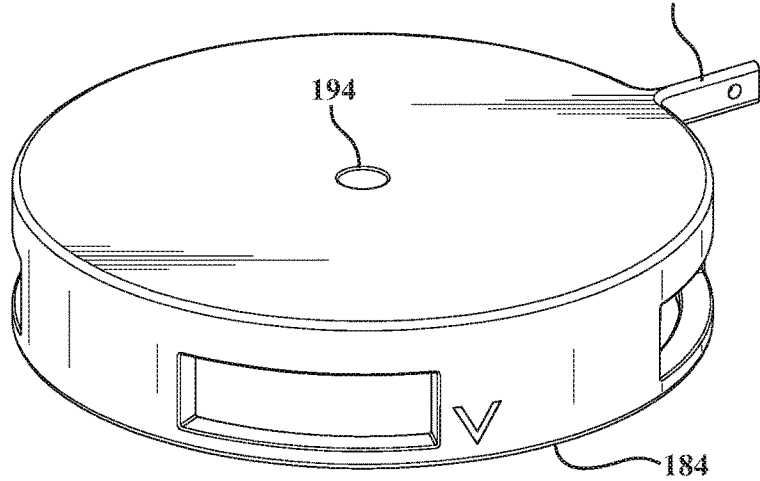
FIG. 10C is a perspective view of a second portion of the upper air vent of FIG. 10A.

With particular reference to FIG. 10C, the second vent part 184 is designed to fit over a top portion of the first vent part 182. The second vent part 184 is rotatably coupled to the first vent part 182 via a fastener (not shown) inserted through an aperture 194 in a top surface of the second vent part 184 and fastened to the first vent part 182 via a threaded aperture 196. The second vent part 184 includes a plurality of rectangular exterior vent apertures 199 that coincide with the interior vent apertures 190 of the first vent part 182. The second vent part 184 is rotatably between a first position and a second position. In the first position, the adjustable orifices 186 are fully closed (referenced by indicia "0" in the illustrated embodiment). In the second position, the adjustable orifices 186 are fully opened reference by indicia "5" in the illustrated embodiment. A handle 198 may be connected to an arm 200 extending from the second vent part 184. The size of the orifices 188 may be adjusted through movement of the second vent part 184 relative to the first vent part 182 using the handle 198.

Figure 11A:
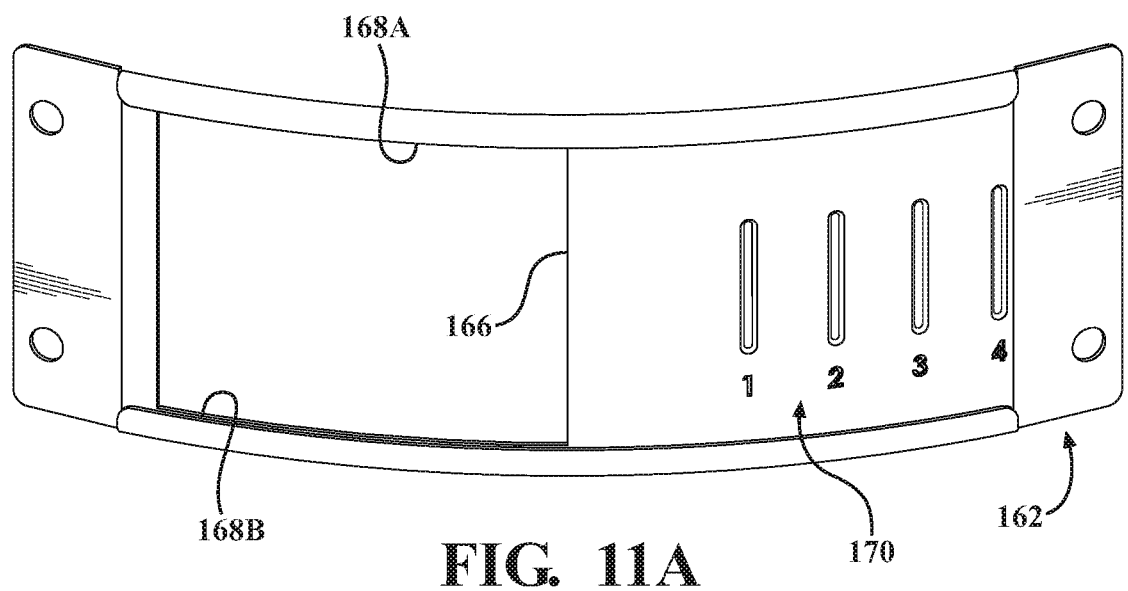
FIG. 11A is a perspective view of a lower vent base of a lower vent assembly of the grill of FIG. 1A.
Figure 11B:
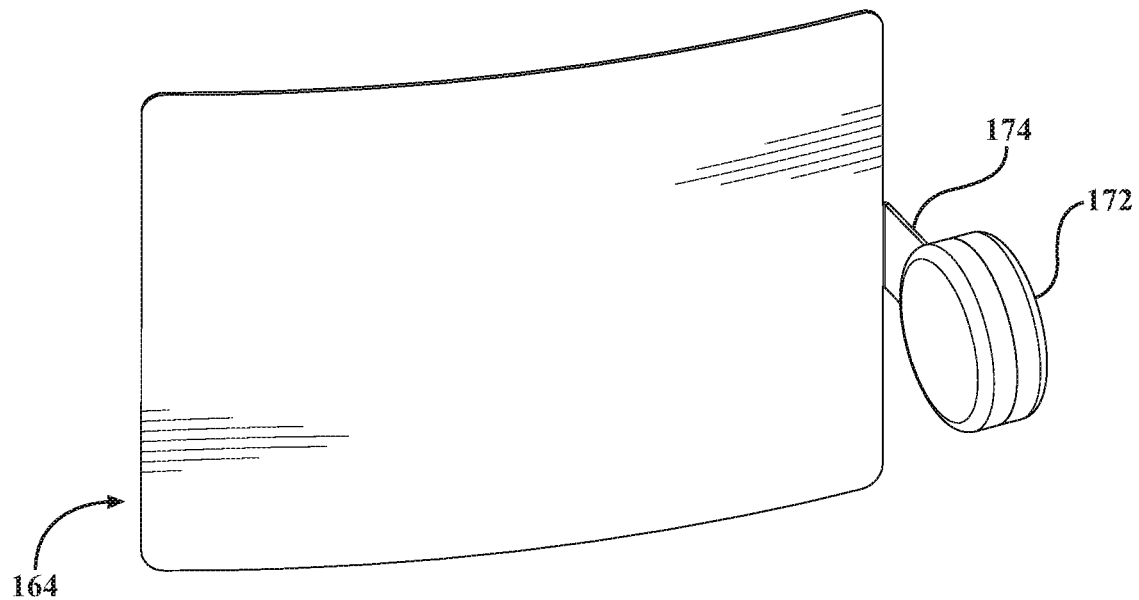
FIG. 11B is a perspective view of a solid vent slide of the lower vent assembly of FIG. 11A.

With reference to FIGS. 11A and 11B, the lower vent assembly 160 includes a lower vent base 162 and solid and mesh vent slides 164, 165. The lower vent base 162 may be fixedly fastened to a protrusion 26 in the bottom side wall 18 of the bottom portion 14. The protrusion 26 includes an aperture 28 (see FIGS. 3A-3D). The lower vent base 162 may be fixedly connected to the protrusion 26 via fasteners (not shown). The lower vent base 162 includes a vent aperture 166 which generally matches the size of the aperture 28 in the protrusion 26. The lower vent base 162 forms an upper channel 168A and a lower channel 168B and includes indicia 170. The lower vent base 162 and the solid and mesh vent slides 164, 165 may be generally composed of metal. For example, the lower vent base 162 and the solid and mesh vent slides 164, 165 may be composed from stainless steel, such as 18/8 stainless steel or SAE 304 stainless steel.

The first and cover vent parts 164, 165 are designed to fit within the upper and lower channels 168A, 168B and to be moveable between first and second positions. In FIGS. 1B and 11A-11C, the first position is all the way to the left and the second position is all the way to the right. In the first position, the solid and mesh vent slides 164,165 cover the vent aperture 166 in the lower vent base 162. In the second position, the vent aperture 166 are not covered by the solid and mesh vent slides 164, 165. As shown, the solid vent slide 164 is solid such that when the solid vent slide 164 is fully within the first portion, the vent aperture 166 is fully blocked. Thus, when the solid vent slide 164 is within the first position, air flow through the lower vent assembly 160 is generally blocked (allowing for some leakage). As shown, the mish vent slide 165 is grated, i.e., has a plurality of apertures therethrough. The solid and mesh vent slides 164, 165 are independently moveable, thus allowing air flow through the lower vent assembly 160 to be fully adjustable. A handle 172, 173 may be connected to an arm 174, 175 extending from the solid and mesh vent slides 164,165, respectively. Although independently movable, in the illustrated embodiment if the solid vent slide 164 is not in the second position and the mesh vent slide 165 is moved towards the second position, an edge of the mesh vent slide 165 will engage the arm 174 of the solid vent slide 164. Subsequent movement of the mesh vent slide 165 towards the second position will cause joint movement of the solid vent slide 164. Likewise, in the illustrated embodiment if the mesh vent slide 165 is not in the first position and the solid vent slide 164 is moved towards the first position, an edge of the mesh vent slide 165 will engage the arm 175 of the mesh vent slide 165. Subsequent movement of the solid vent slide 164 towards the first position will cause joint movement of the mesh vent slide 165. Air flow through the lower vent assembly 160 may be adjusted through movement of the solid and mesh vent slides 164, 165 relative to the lower vent base 162 using the respective handle 172, 173.

In use, the amount of airflow, and thereby the temperature in the cooking chamber 40 may be adjusted via manipulation of the lower and upper vent assemblies 160, 180.

With reference to FIGS. 14A-14F, hanging cooking kit 210 may be provided as a cooking accessory. In the illustrated embodiment, the hanging cooking kit 210 includes a cook grate or grill 212, a fork assembly 214 and a drip pan 216. The cooking grate 212 sits on top of the firebox 50 and the drip pan 216 rests in the center of the cooking grate 212. The cooking grate 212 includes first and second upright arms 218, each with an aperture. The hanging cooking kit 210 may be generally composed of metal. For example, the hanging cooking kit 210 may be composed from stainless steel, such as 18/8 stainless steel or SAE 304 stainless steel.

The fork assembly 214 of the illustrated embodiment further includes a curved suspension rod 220. Opposite ends of the curved suspension rod 220 may be inserted into the aperture of respective upright arms 218. The curved suspension rod 220 may be fixed to the cooking grate 212 via fasteners 222, e.g., thumb screws, inserted into a threaded aperture in the respective upright arm 218. A center aperture 224 receives a hook 226 of an extension rod 228. The fork assembly 214 includes a fork 230 having a plurality of upright tines 232. The fork 230 may be fastened to an end of the extension rod 228 via a fastener 234.

In use, food items may be hung from the tines 232 of the fork 230. The fork 230 may be adjusted up and down along the length of the extension rod 228. Food items suspended from the fork 230 may be cooked by indirect heat transfer. At the same time, other food items may be cooked by placing these feed items directly on the cooking grate or grill 212.

The invention has been described in an illustrative manner, and it is be understood that the terminology which has been used is intended to be in the nature of words of description rather than of limitation. It is now apparent to those skilled in the art that many modifications and variations of the present invention are possible in light of the above teachings. It is, therefore, to be understood that the invention may be practiced otherwise than as specifically described.

What is claimed is:

1. A firebox assembly for use in a grill, comprising:
a firebox having a firebox lower opening, a firebox upper opening, and a firebox side wall extending between the firebox lower and upper openings forming a heat chamber, the firebox having a support structure extending from the firebox lower opening in a direction opposite the firebox upper opening, wherein the support structure is configured to rest on an inner surface of the grill with the support structure and the firebox lower opening defining an air path to the heat chamber; and,
an ash bucket having an ash bucket base, an ash bucket upper opening and an ash bucket side wall with the ash bucket side wall extending between the ash bucket base and the ash bucket upper opening defining an ash receptacle, wherein the ash bucket further includes an air vent extending from the ash bucket base into the ash receptacle and having an upper vent aperture with a cover connected to the air vent and disposed over the upper vent aperture to define an air gap.

2. A firebox assembly, as set forth in claim 1, wherein the air vent includes an air vent side wall extending from a lower vent aperture in the ash bucket base and forming an air vent column.

3. A firebox assembly, as set forth in claim 2, wherein the lower vent aperture and the air vent column have a circular cross-section and are centered on an axis of the ash bucket.

4. A firebox assembly, as set forth in claim 2, wherein the upper vent aperture is located at an end of the air vent column opposite the lower vent aperture with the air gap being defined by the upper vent aperture and a lower surface of the cover.

5. A firebox assembly, as set forth in claim 4, wherein the air gap is located around an outer periphery of the upper vent aperture and a distance between the upper vent aperture and the cover is relatively constant about the outer periphery of the upper vent aperture.

6. A firebox assembly, as set forth in 1, wherein the ash bucket includes a fuel grate lip adjacent the ash bucket upper opening, the fuel grate lip configured to support a fuel grate.

7. A firebox assembly, as set forth in claim 6, wherein the fuel grate lip defines a lip plane and the ash bucket upper opening defines an ash bucket upper opening plane, wherein the lip plane is closer to the ash bucket base than the ash bucket upper opening plane.

8. A firebox assembly, as set forth in claim 1, wherein the cover has a diameter that is greater than a diameter of the upper vent aperture.

9. A firebox assembly, as set forth in claim 1, including a vent bracket having a first end and a second end with the first end of the vent bracket connected to the air vent adjacent the vent upper aperture and the cover being connected to the second end of the vent bracket.

10. A firebox assembly, as set forth in claim 1, wherein the ash bucket includes an ash bucket lip and the firebox side wall includes a ledge, wherein the ash bucket lip rests, and is supported by, the ledge.

11. A firebox assembly, as set forth in claim 10, wherein the ash bucket base is spaced a distance from an inner surface of the bottom base of the bottom portion.

12. A firebox assembly, as set forth in claim 1, wherein the firebox includes one or more vent apertures located within the firebox sidewall.

13. A firebox assembly, as set forth in claim 12, wherein the vent apertures in the firebox sidewall define a second air path from the internal bottom cavity into the heat chamber.

14. A firebox assembly, as set forth in claim 1, wherein the firebox includes a support structure that extends from the firebox lower opening in a direction opposite the firebox upper opening, wherein the bottom portion is configured to receive the firebox with the support structure resting on an inner surface of the bottom base.

15. A firebox assembly, as set forth in claim 14, wherein the support structure includes a plurality of legs that extend from the firebox side wall.

16. A grill apparatus, comprising:
a bottom portion having a bottom base, a bottom side wall and a bottom upper opening with the bottom side wall extending between the bottom base and the bottom upper opening forming an internal bottom cavity;
a lid portion having a lid upper end, a lid side wall, and a lid lower opening with the lid side wall extending between the lid upper end and the lid lower opening forming an internal lid cavity, wherein the lid portion is coupled to the bottom portion with the internal bottom cavity and the internal lid cavity forming a cooking chamber;
a firebox having a firebox lower opening, a firebox upper opening, and a firebox side wall extending between the firebox lower and upper openings forming a heat chamber, the firebox having a support structure extending from the firebox lower opening in a direction opposite the firebox upper opening, wherein the bottom portion receives the firebox with the support structure resting on an inner surface of the bottom base, wherein the inner surface of the bottom base, the support structure of the firebox and the firebox lower opening define a first air path from a lower portion of the cooking chamber to the heat chamber; and,
an ash bucket having an ash bucket base, an ash bucket upper opening and an ash bucket side wall with the ash bucket side wall extending between the ash bucket base and the ash bucket upper opening defining an ash receptacle, wherein the ash bucket further includes an air vent extending from the ash bucket base into the ash receptacle and having an upper vent aperture with a vent cover connected to the air vent and disposed over the upper vent aperture to further define the first air path.

17. A grill apparatus, as set forth in claim 16, wherein the air vent includes an air vent side wall extending from a lower aperture in the ash bucket base and forming an air vent column.

18. A grill apparatus, as set forth in claim 17, wherein the air vent lower aperture and the air vent column having a circular cross-section and being centered on an axis of the ash bucket.

19. A grill apparatus, as set forth in claim 17, wherein the upper aperture is located at an end of the air vent column opposite the lower aperture with an air gap being defined by the upper aperture and a lower surface of the vent cover.

20. A grill apparatus, as set forth in claim 19, wherein the air gap is located around an outer periphery of the upper vent aperture and the distance between the upper vent aperture and the vent cover is relatively constant about the outer periphery of the upper vent aperture.

21. A grill apparatus, as set forth in claim 16, wherein the ash bucket includes a fuel grate lip adjacent the ash bucket upper opening, the fuel grate lip configured to support a fuel grate.

22. A grill apparatus, as set forth in claim 21, wherein the fuel grate lip defines a lip plane and the ash bucket upper opening defines an ash bucket upper opening plane, wherein the lip plane is closer to the ash bucket base than the ash bucket upper opening plane.

23. A grill apparatus, as set forth in claim 16, wherein the vent cover has a diameter that is greater than a diameter of the upper vent aperture.

24. A grill apparatus, as set forth in claim 16, including a vent bracket having a first end and a second end with the first end of the vent bracket connected to the air vent adjacent the upper vent aperture and the vent cover being connected to the second end of the vent bracket.

25. A grill apparatus, as set forth in claim 16, wherein the ash bucket includes an ash bucket lip and the firebox side wall includes a ledge, wherein the ash bucket lip rests, and is supported by, the ledge.

26. A grill apparatus, as set forth in claim 25, wherein the ash bucket base is spaced a distance from an inner surface of the bottom base of the bottom portion.

27. A grill apparatus, as set forth in claim 26, including a lower vent aperture located in the bottom side wall of the bottom portion and an adjustable lower vent assembly associated with the lower vent aperture.

28. A grill apparatus, as set forth in claim 16 wherein the firebox includes one or more vent apertures located within the firebox sidewall.

29. A grill apparatus, as set forth in claim 28, wherein the vent apertures in the firebox sidewall define a second air path from the internal bottom cavity into the heat chamber.

30. A grill apparatus, as set forth in claim 16 wherein the top portion includes a lid upper opening located at the lid upper end and an adjustable upper vent assembly associated with the lid upper opening.

31. A grill apparatus, as set forth in claim 16, wherein the firebox includes a support structure that extends from the firebox lower opening in a direction opposite the firebox upper opening, wherein the bottom portion is configured to receive the firebox with the support structure resting on an inner surface of the bottom base.

32. A grill apparatus, as set forth in claim 31, wherein the support structure includes a plurality of legs that extend from the firebox side wall.

\* \* \* \* \*